(12) United States Patent
Hayashi

(10) Patent No.: US 10,762,043 B2
(45) Date of Patent: Sep. 1, 2020

(54) INFORMATION PROCESSING SYSTEM, INFORMATION PROCESSING APPARATUS, AND INFORMATION PROCESSING METHOD

(71) Applicant: Yuuichiroh Hayashi, Kanagawa (JP)

(72) Inventor: Yuuichiroh Hayashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 849 days.

(21) Appl. No.: 14/879,192

(22) Filed: Oct. 9, 2015

(65) Prior Publication Data

US 2016/0117340 A1    Apr. 28, 2016

(30) Foreign Application Priority Data

Oct. 23, 2014 (JP) .................. 2014-216262
Sep. 14, 2015 (JP) .................. 2015-181195

(51) Int. Cl.
  *G06F 16/16* (2019.01)
  *G06F 16/185* (2019.01)

(52) U.S. Cl.
  CPC ............ *G06F 16/16* (2019.01); *G06F 16/168* (2019.01); *G06F 16/185* (2019.01)

(58) Field of Classification Search
  None
  See application file for complete search history.

(56) References Cited

U.S. PATENT DOCUMENTS 5,692,206 A * 11/1997 Shirley .................. G06F 40/56
                                                    715/256
2003/0063134 A1* 4/2003 Lord ................. G06F 17/30961
                                                    715/853

(Continued)

FOREIGN PATENT DOCUMENTS

| JP | 2013-092833 | 5/2013 |
| JP | 2013-109645 | 6/2013 |
| WO | 2012/160772 | 11/2012 |

OTHER PUBLICATIONS

Jpsoft, Display information about files and subdirectories, Feb. 10, 2013 (Year: 2013).*

(Continued)

*Primary Examiner* — Usmaan Saeed
*Assistant Examiner* — Yu Zhao
(74) *Attorney, Agent, or Firm* — IPUSA, PLLC

(57) ABSTRACT

An information processing method includes storing information identifying an external service and information of an acquisition method for acquiring folder information from the external service; receiving, from a device, a request to acquire the folder information from the external service; identifying the acquisition method for acquiring the folder information from the external service, based on the stored information; acquiring the folder information from the external service, based on the identified acquisition method; and sending the acquired folder information to the device. When the identified acquisition method is a first acquisition method, folder information of a hierarchy of a specified folder and in a predetermined number of lower hierarchies is acquired from the external service. When the identified acquisition method is a second acquisition method, folder information of a hierarchy of a specified folder and in all lower hierarchies is acquired from the external service.

12 Claims, 22 Drawing Sheets

35D

| STORAGE SERVICE NAME | HOST NAME | AUTHENTICATION METHOD | ACQUISITION METHOD OF FOLDER INFORMATION |
|---|---|---|---|
| storage1 | www.storage1.com | oauth | Bundle |
| storage2 | www.storage2.co.jp | oauth | OnlySubFolder |
| storage3 | www.storage3.com | oauth | Bundle |
| ... | ... | ... | ... |

(56) References Cited

U.S. PATENT DOCUMENTS

| | | | |
|---|---|---|---|
| 2003/0078945 A1 | 4/2003 | Kibuse | |
| 2004/0044746 A1* | 3/2004 | Matsusaka | H04L 29/06 709/217 |
| 2004/0201668 A1* | 10/2004 | Matsubara | H04L 67/1044 348/14.05 |
| 2009/0172601 A1 | 7/2009 | Behrens et al. | |
| 2012/0066315 A1* | 3/2012 | Tuman | G06F 17/30879 709/206 |
| 2012/0331108 A1* | 12/2012 | Ferdowsi | H04L 67/06 709/219 |
| 2013/0007207 A1* | 1/2013 | Dietrich | G06F 16/183 709/217 |
| 2013/0100477 A1 | 4/2013 | Ozaki | |
| 2014/0006350 A1* | 1/2014 | Fukui | G06F 17/30377 707/632 |
| 2014/0173523 A1 | 6/2014 | Scherpa et al. | |
| 2014/0281322 A1* | 9/2014 | Martin | G06F 3/0611 711/165 |

OTHER PUBLICATIONS

Anonymous: "How to send pictures directly from Android camera to Dropbox", May 7, 2011, Retrieved from the Internet: URL:https://www.cnet.com/how-to/how-to-send-pictures-directly-from-android-camera-to-dropbox/ [retrieved on Dec. 5, 2016].

Anonymous: "Brother Web Connect—Compatible Printer Apps", Oct. 11, 2014, Retrieved from the Internet: URL: https://web.archive.org/web/20141011220836/http://www.brother-usa.com/connect/web#.WEVCwXqBhAM [retrieved on Dec. 5, 2016].

Office Action dated Dec. 12, 2016.

Extended European Search Report dated Mar. 4, 2016.

\* cited by examiner

| STORAGE SERVICE NAME | HOST NAME | AUTHENTICATION METHOD | ACQUISITION METHOD OF FOLDER INFORMATION |
|---|---|---|---|
| storage1 | www.storage1.com | oauth | Bundle |
| storage2 | www.storage2.co.jp | oauth | OnlySubFolder |
| storage3 | www.storage3.com | oauth | Bundle |
| ... | ... | ... | ... |

FIG.8A

```
{
  "name" : "storage1",
  "host" : "www.storage1.com",
  "auth_type" : "oauth",
  "folder_acquisition_type":"Bundle"
}
```

FIG.8B

```
{
  "name" : "storage2",
  "host" : "www.storage2.co.jp",
  "auth_type" : "oauth",
  "folder_acquisition_type":"OnlySubFolder"
}
```

FIG.9A

ACQUISITION METHOD OF FOLDER INFORMATION =Bundle

HTTP Method: GET
URI: /folders?folder_id=xxx&hierarchy=all

FIG.9B

ACQUISITION METHOD OF FOLDER INFORMATION =OnlySubFolder

HTTP Method: GET
URI: /folders?folder_id=xxx&hierarchy=1

FIG.10

```
{
  "folders": {
    "id" : "xxx",
    "name" : "user1",
    "subfolders" : [
      {
        "id" : "yyy1",
        "name" : "folder1",
        "subfolders" : [
          {
            "id" : "zzz",
            "name" : "folder3",
            "subfolders" : [],
            "path" : [ "user1", "folder1","folder3"],
            "has_subfolder" : false
          }
        ],
        "path" : [ "user1", "folder1"],
        "has_subfolder" : true
      },
      {
        "id" : "yyy2",
        "name" : "folder2",
        "subfolders" : [],
        "path" : [ "user1", "folder2"],
        "has_subfolder" : false
      }
    ],
    "path" : [ "user1" ],
    "has_subfolder" : true
  }
}
```

FIG.14A

```
{
  "folders":[
    {
      "id" : "xxx",
      "name" : "user1",
      "subfolders" : [
        {
          "id" : "yyy1",
          "name" : "folder1",
          "subfolders" : [],
          "path" : [ "user1", "folder1"],
          "has_subfolder" : false  } 2100
        },
        {
          "id" : "yyy2",
          "name" : "folder2",
          "subfolders" : [],
          "path" : [ "user1", "folder2"],
          "has_subfolder" : false  } 2200
        }
      ],
      "path" : [ "user1" ],
      "has_subfolder" : true
    }
  ]
}
```

FIG.14B

```
{
  "folders":[
    {
      "id" : "yyy1",
      "name" : "folder1",
      "subfolders" : [
        {
          "id" : "zzz",
          "name" : "folder3",
          "subfolders" : [],
          "path" : [ "user1", "folder1", "folder3"],
          "has_subfolder" : false  } 2300
        }
      ],
      "path" : [ "user1", "folder1"],
      "has_subfolder" : true
    }
  ]
}
```

FIG.14C

```
{
  "folders":[
    {
      "id" : "zzz",
      "name" : "folder3",
      "subfolders" : [],
      "path" : [ "user1", "folder1", "folder3"],
      "has_subfolder" : false
    }
  ]
}
```

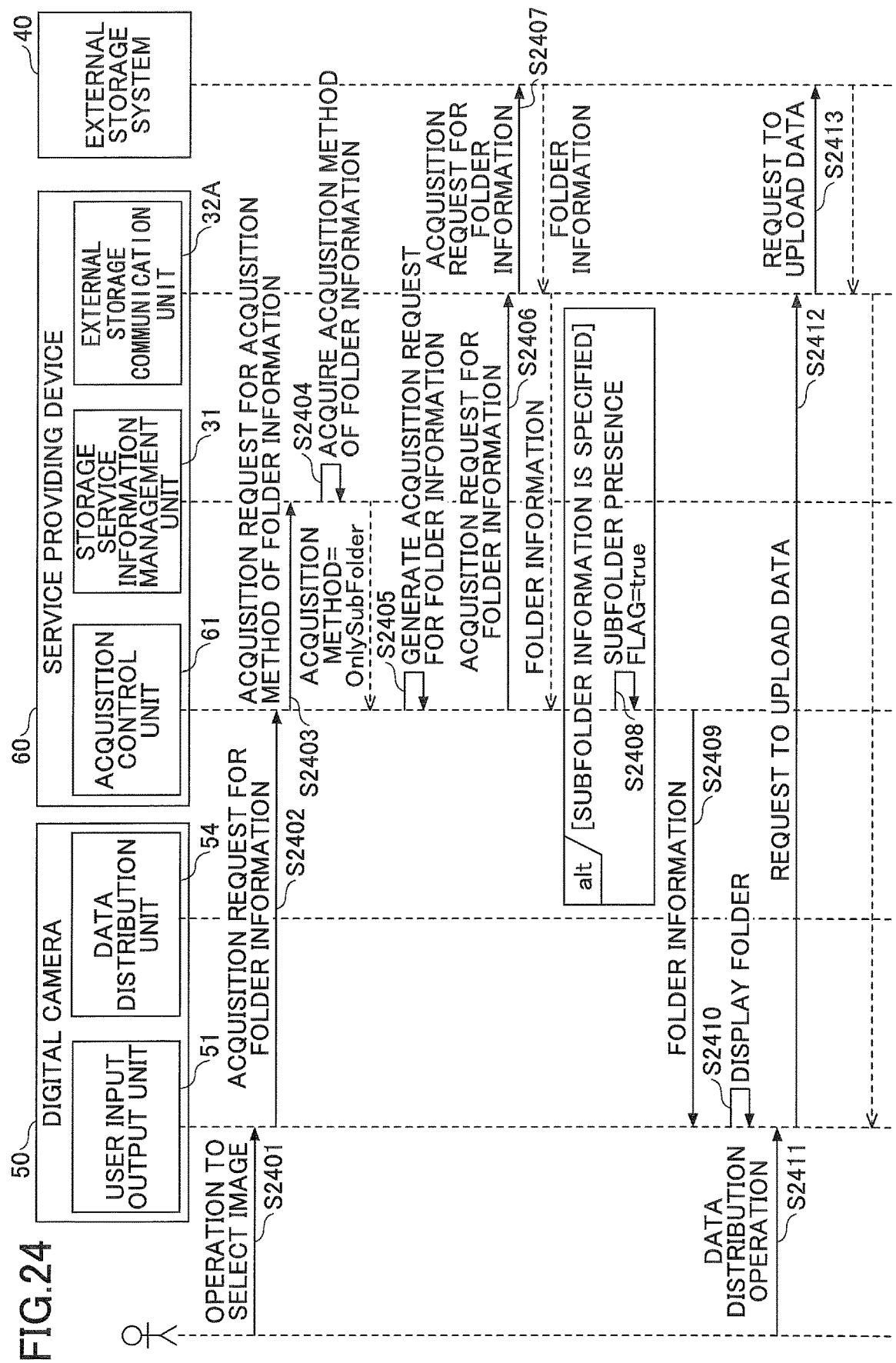

INFORMATION PROCESSING SYSTEM, INFORMATION PROCESSING APPARATUS, AND INFORMATION PROCESSING METHOD

BACKGROUND OF THE INVENTION

1. Field of the Invention

The present invention relates to an information processing system, an information processing apparatus, and an information processing method.

2. Description of the Related Art

In recent years, various external services have been provided by cloud computing, etc. For example, there is known an external service for storing electronic data in an external storage. In order to use such an external service, there is conventionally known a technology of storing electronic data, which is managed in a client terminal, in an external storage specified by the user (see, for example, Patent Document 1).

However, in the above conventional technology, depending on the Web API (Application Programming Interface) provided by the external storage, there have been cases where the user's comfortable usage is impaired. For example, depending on the external storage, there are cases where a Web API, which is for collectively acquiring folder information of folders in the hierarchy of the specified folder and in all hierarchies lower than that of the specified folder in the external storage, is not provided. In the case of an external storage without such a Web API, for example, the folder information of folders in the hierarchy of the specified folder and in one hierarchy lower than that of the specified folder is acquired in units of one hierarchy, and the user has to wait until all of the folder information is acquired.

Patent Document 1: Japanese Laid-Open Patent Publication No. 2013-92833

SUMMARY OF THE INVENTION

The present invention provides an information processing system, an information processing apparatus, and an information processing method, in which one or more of the above-described disadvantages are eliminated.

According to an aspect of the present invention, there is provided an information processing system including one or more information processing apparatuses for implementing various functions of the information processing system, the information processing system including a first storage unit configured to store, in association with each other, identification information identifying an external service and information relating to an acquisition method for acquiring information of a folder from the external service, for each of a plurality of the external services respectively including the folder for storing electronic data; a receiving unit configured to receive, from a device connected to the information processing system via a network, a request to acquire, from a first external service among the plurality of the external services, the information of the folder included in the first external service; an identification unit configured to identify the acquisition method for acquiring the information of the folder from the first external service, based on the information relating to the acquisition method for acquiring the information of the folder stored in the first storage unit in association with the identification information identifying the first external service relating to the request, when the request is received by the receiving unit; a first acquisition unit configured to acquire the information of the folder from the first external service, based on the acquisition method identified by the identification unit; and a sending unit configured to send the information of the folder acquired by the first acquisition unit, to the device that is a request source of the request, wherein when the acquisition method identified by the identification unit is a first acquisition method of acquiring, from the external service, information of folders in a hierarchy of a specified folder and in a predetermined number of hierarchies lower than the hierarchy of the specified folder, the first acquisition unit acquires, from the first external service, the information of folders in a hierarchy of a specified folder and in a predetermined number of hierarchies lower than the hierarchy of the specified folder, and when the acquisition method identified by the identification unit is a second acquisition method of acquiring, from the external service, information of folders in a hierarchy of a specified folder and in all hierarchies lower than the hierarchy of the specified folder, the first acquisition unit acquires, from the first external service, the information of folders in a hierarchy of a specified folder and in all hierarchies lower than the hierarchy of the specified folder.

According to an aspect of the present invention, there is provided an information processing apparatus including a first storage unit configured to store, in association with each other, identification information identifying an external service and information relating to an acquisition method for acquiring information of a folder from the external service, for each of a plurality of the external services respectively including the folder for storing electronic data; a receiving unit configured to receive, from a device connected to the information processing apparatus via a network, a request to acquire, from a first external service among the plurality of the external services, the information of the folder included in the first external service; an identification unit configured to identify the acquisition method for acquiring the information of the folder from the first external service, based on the information relating to the acquisition method for acquiring the information of the folder stored in the first storage unit in association with the identification information identifying the first external service relating to the request, when the request is received by the receiving unit; a first acquisition unit configured to acquire the information of the folder from the first external service, based on the acquisition method identified by the identification unit; and a sending unit configured to send the information of the folder acquired by the first acquisition unit, to the device that is a request source of the request, wherein when the acquisition method identified by the identification unit is a first acquisition method of acquiring, from the external service, information of folders in a hierarchy of a specified folder and in a predetermined number of hierarchies lower than the hierarchy of the specified folder, the first acquisition unit acquires, from the first external service, the information of folders in a hierarchy of a specified folder and in a predetermined number of hierarchies lower than the hierarchy of the specified folder, and when the acquisition method identified by the identification unit is a second acquisition method of acquiring, from the external service, information of folders in a hierarchy of a specified folder and in all hierarchies lower than the hierarchy of the specified folder, the first acquisition unit acquires, from the first external service, the information of folders in a hierarchy of a specified folder and in all hierarchies lower than the hierarchy of the specified folder.

According to an aspect of the present invention, there is provided an information processing method performed by an information processing system including a storage unit configured to store, in association with each other, identification information identifying an external service and information relating to an acquisition method for acquiring information of a folder from the external service, for each of a plurality of the external services respectively including the folder for storing electronic data, and one or more information processing apparatuses for implementing various functions of the information processing system, the information processing method including receiving, from a device connected to the information processing system via a network, a request to acquire, from a first external service among the plurality of the external services, the information of the folder included in the first external service; identifying the acquisition method for acquiring the information of the folder from the first external service, based on the information relating to the acquisition method for acquiring the information of the folder stored in the storage unit in association with the identification information identifying the first external service relating to the request, when the request is received at the receiving; acquiring the information of the folder from the first external service, based on the acquisition method identified at the identifying; and sending the information of the folder acquired at the acquiring, to the device that is a request source of the request, wherein when the acquisition method identified at the identifying is a first acquisition method of acquiring, from the external service, information of folders in a hierarchy of a specified folder and in a predetermined number of hierarchies lower than the hierarchy of the specified folder, the acquiring includes acquiring, from the first external service, the information of folders in a hierarchy of a specified folder and in a predetermined number of hierarchies lower than the hierarchy of the specified folder, and when the acquisition method identified at the identifying is a second acquisition method of acquiring, from the external service, information of folders in a hierarchy of a specified folder and in all hierarchies lower than the hierarchy of the specified folder, the acquiring includes acquiring, from the first external service, the information of folders in a hierarchy of a specified folder and in all hierarchies lower than the hierarchy of the specified folder.

BRIEF DESCRIPTION OF THE DRAWINGS

Other objects, features and advantages of the present invention will become more apparent from the following detailed description when read in conjunction with the accompanying drawings, in which:

FIG. 5 is a configuration diagram of an example of storage service information;

FIGS. 8A and 8B illustrate examples of storage service information;

FIGS. 9A and 9B illustrate examples of an acquisition request for folder information;

FIG. 10 illustrates an example of folder information;

FIGS. 14A through 14C illustrate other examples of folder information;

FIG. 24 is a sequence diagram of another example of a data distribution process according to the third embodiment.

DETAILED DESCRIPTION OF THE PREFERRED EMBODIMENTS

A description is given, with reference to the accompanying drawings, of embodiments of the present invention.

First Embodiment

System Configuration

Figure 1:
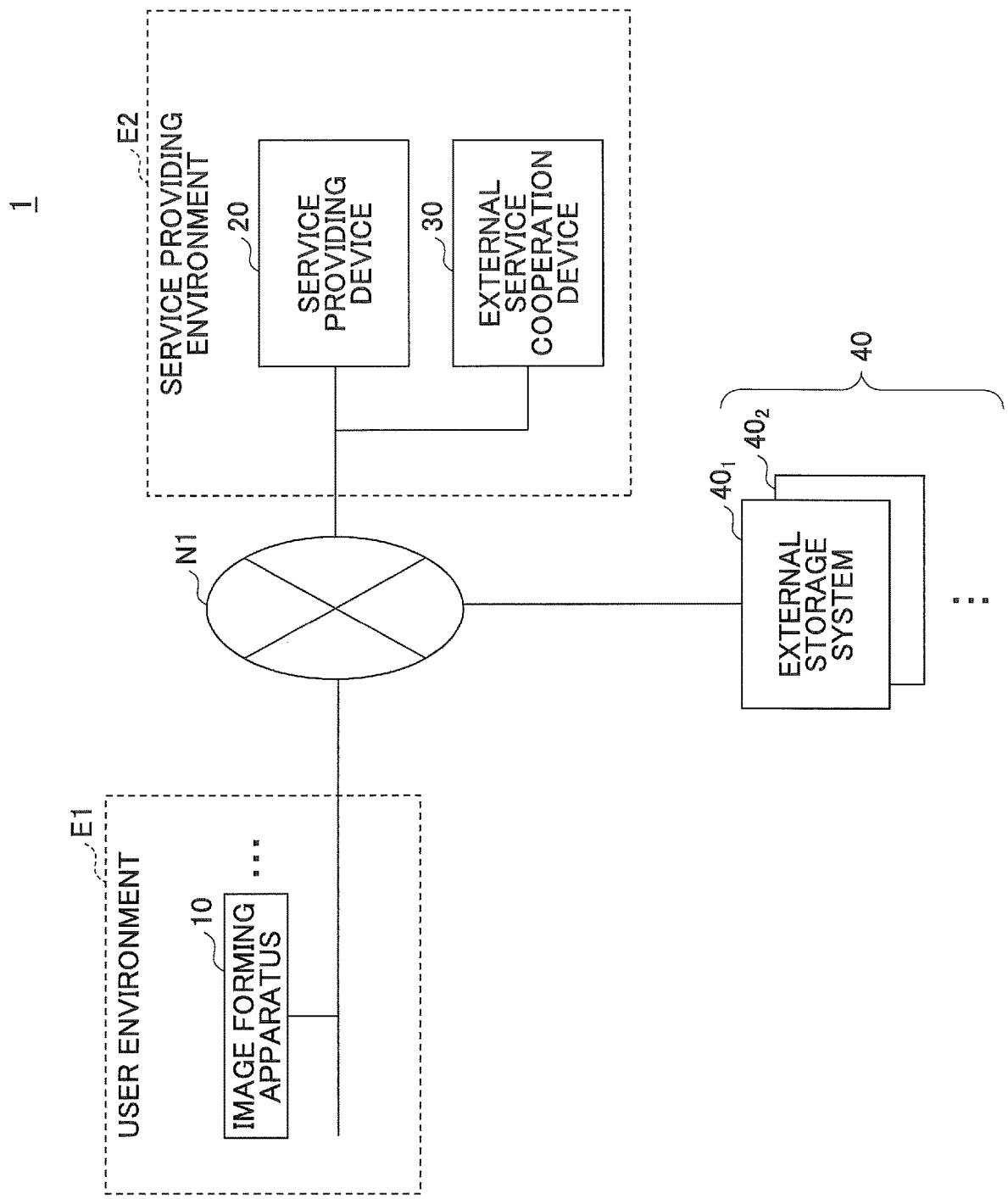
FIG. 1 is a configuration diagram of an example of an information processing system according to a first embodiment.

First, a description is given of a system configuration of an information processing system 1 according to a first embodiment. FIG. 1 is a configuration diagram of an example of an information processing system according to a first embodiment. In the information processing system 1 illustrated in FIG. 1, a service providing environment E2, a user environment E1, an external storage system 40, etc., are communicatively connected to each other via a wide-area network N1 such as the Internet.

The service providing environment E2 is a system environment for providing an external service such as a cloud service via a network. Note that in the present embodiment, a description is given of a cloud service as a specific example of the external service; however, the present embodiment may be applied to a service that is provided via a network such as a service provided by ASP (Application Service Provider) and a web service.

The service providing environment E2 includes a service providing device 20 which is realized by one or more information processing apparatuses, and an external service cooperation device 30 realized by one or more information processing apparatuses. However, each of the service providing device 20 and the external service cooperation device 30 may be realized by a single information processing apparatus.

The service providing device 20 provides a predetermined service via a network. For example, the service providing device 20 provides a service of storing, in a specified storage destination (a specified folder in the external storage system 40), image data that is generated by scanning an original document in an image forming apparatus 10 in the user environment E1.

Furthermore, the external service cooperation device 30 mediates the service providing device 20 and the external storage system 40. For example, the external service cooperation device 30 acquires, from the external storage system 40, folder information for specifying a folder to be the storage destination of the image data, in response to a request from the service providing device 20.

In the present embodiment, as one example, the service providing environment E2 is described as providing a cloud storage service (hereinafter, simply referred to as "storage service") in cooperation with the external storage system 40. More specifically, a description is given of a case where the image data generated by scanning an original document in the image forming apparatus 10, is stored in a specified folder in the external storage system 40 providing a storage service. However, the cloud service provided by the service providing environment E2 is not limited to a storage service. For example, the cloud service may be for performing an OCR (Optical Character Recognition) process on image data generated by scanning an original document in the image forming apparatus 10, or the cloud service may be for performing a translation process of translating text data described in a particular language into another language.

Note that all of or some of the service providing devices 20 and all of or some of the external service cooperation devices 30 may be respectively installed in the user environment E1. That is, all of or some of the information processing apparatuses constituting the service providing devices 20 and the external service cooperation devices 30 may be included in the user environment E1.

The user environment E1 is, for example, a system environment in a company, etc., which is the user using the image forming apparatus 10. In the user environment E1, one or more image forming apparatuses 10 are connected to a network such as a LAN (Local Area Network), etc. Furthermore, the user environment E1 may include, for example, a PC terminal, etc., that the user uses to make a setting of a default (standard) storage destination of the user himself/herself in the storage service, setting an account, etc.

Note that the image forming apparatus 10 according to the present embodiment is an image forming apparatus including a scanning function. However, a multifunction peripheral including functions other than the scanning function such as a print function, a copy function, a fax communication function, etc., may be used as the image forming apparatus 10.

The external storage system 40 is a computer system that provides a cloud service referred to as a storage service (or online storage) via a network. A storage service is a service of renting out a storage area in the storage of the external storage system 40. In the present embodiment, the storage area rented out by the external storage system 40 is the storage destination of image data in the storage service provided to the image forming apparatus 10 by the service providing device 20. That is, the image data generated in the image forming apparatus 10 is stored in a folder allocated in the storage area of the external storage system 40. In the following, when a plurality of external storage systems 40 are distinguished form each other, they are denoted as external storage system $40_1$, external storage system $40_2$, and so on.

Note that the external storage system 40 may be a system that is realized by a plurality of information processing apparatuses. Furthermore, the configuration of the information processing system 1 illustrated in FIG. 1 is one example; the information processing system 1 may have other configurations.

<Hardware Configuration>

Next, a description is given of a hardware configuration of the information processing system 1 according to the first embodiment.

<<Service Providing Device, External Service Cooperation Device>>

Figure 2:
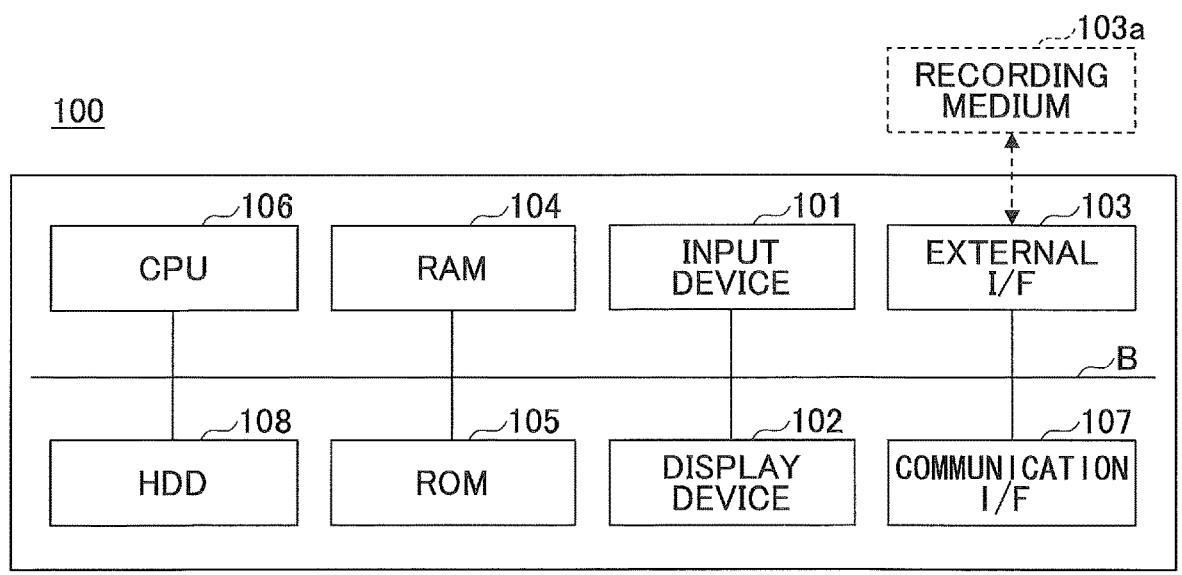
FIG. 2 is a hardware configuration diagram of an example of a computer.

The service providing device 20 and the external service cooperation device 30 according to the first embodiment have a hardware configuration as illustrated in FIG. 2, for example. FIG. 2 is a hardware configuration diagram of an example of a computer. A computer 100 illustrated in FIG. 2 includes an input device 101, a display device 102, an external I/F 103, a RAM (Random Access Memory) 104, a ROM (Read Only Memory) 105, a CPU (Central Processing Unit) 106, a communication I/F 107, and a HDD (Hard Disk Drive) 108, which are connected to each other by a bus B.

The input device 101 includes a keyboard, a mouse, and a touch panel, and is used by the user for inputting various operation signals. The display device 102 includes a display, etc., and displays processing results obtained by the computer 100. Note that the input device 101 and the display device 102 may have a configuration of being connected and used when necessary.

The communication I/F 107 is an interface that connects the computer 100 to the network N1. Accordingly, the computer 100 is able to perform data communication via the communication I/F 107.

Furthermore, the HDD 108 is an example of a non-volatile storage device for storing programs and data. The stored programs and data include an OS (Operating System) that is the basic software for controlling the entire computer 100, and application software for providing various functions in the OS. Note that the computer 100 may use a drive device (for example, a solid state drive: SSD) using a flash memory as the storage medium, instead of the HDD 108.

The HDD 108 manages the stored programs and data by a predetermined file system and/or a DB. The external I/F 103 is an interface between the computer 100 and an external device. An example of the external device is a recording medium 103a.

Accordingly, the computer 100 is able to read and/or write in the recording medium 103a via the external I/F 103. Examples of the recording medium 103a are a flexible disk, a CD, a DVD, an SD memory card, and a USB memory.

The ROM 105 is a non-volatile semiconductor memory (storage device) that can store programs and data even after the power is turned off. The ROM 105 stores programs and data such as a BIOS that is executed when the computer 100 is activated, OS settings, and network settings. The RAM 104 is a volatile semiconductor memory (storage device) for temporarily storing programs and data.

The CPU 106 is a processor for controlling the entire computer 100 and implementing functions of the computer 100, by loading the programs and data from the storage devices such as the ROM 105 and the HDD 108, into the RAM 104, and executing processes. The service providing device 20 and the external service cooperation device 30 are able to implement various processes described below, by the above hardware configuration of the computer 100.

<<Image Forming Apparatus>>

Figure 3:
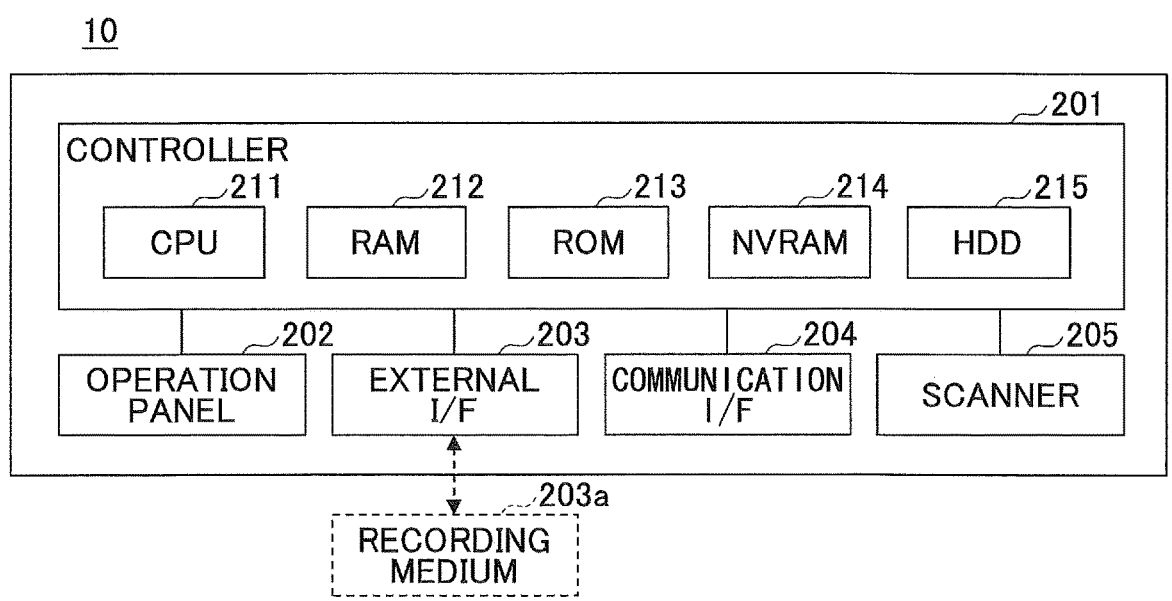
FIG. 3 illustrates a hardware configuration of an example of an image forming apparatus according to the first embodiment.

The image forming apparatus 10 according to the first embodiment is realized by a hardware configuration, for example, as illustrated in FIG. 3. FIG. 3 illustrates a hardware configuration of an example of the image forming apparatus 10 according to the first embodiment. The image forming apparatus 10 illustrated in FIG. 3 includes a controller 201, an operation panel 202, an external I/F 203, a communication I/F 204, and a scanner 205.

The controller 201 includes a CPU 211, a RAM 212, a ROM 213, a NVRAM 214, and a HDD 215. The ROM 213 stores various programs and data. The RAM 212 temporarily stores programs and data. The NVRAM 214 stores, for example, setting information. Furthermore, the HDD 215 stores various programs and data.

The CPU 211 controls the entire image forming apparatus 10 and implements functions of the image forming apparatus 10, by loading the programs and data, setting information, from the ROM 213, the NVRAM 214, and the HDD 215, into the RAM 212, and executing processes.

The operation panel 202 includes an input unit for receiving input from a user, and a display unit for displaying information. The external I/F 203 is an interface between the image forming apparatus 10 and an external device. An example of the external device is a recording medium 203*a*. Accordingly, the image forming apparatus 10 is able to read and/or write in the recording medium 203*a* via the external I/F 203. Examples of the recording medium 203*a* are an IC card, a flexible disk, a CD, a DVD, an SD memory card, and a USB memory.

The communication I/F 204 is an interface that connects the image forming apparatus 10 to the network N1. Accordingly, the image forming apparatus 10 is able to perform data communication via the communication I/F 204. The scanner 205 is a reading device for reading image data (electronic data) from an original document.

<Software Configuration>

Figure 4:
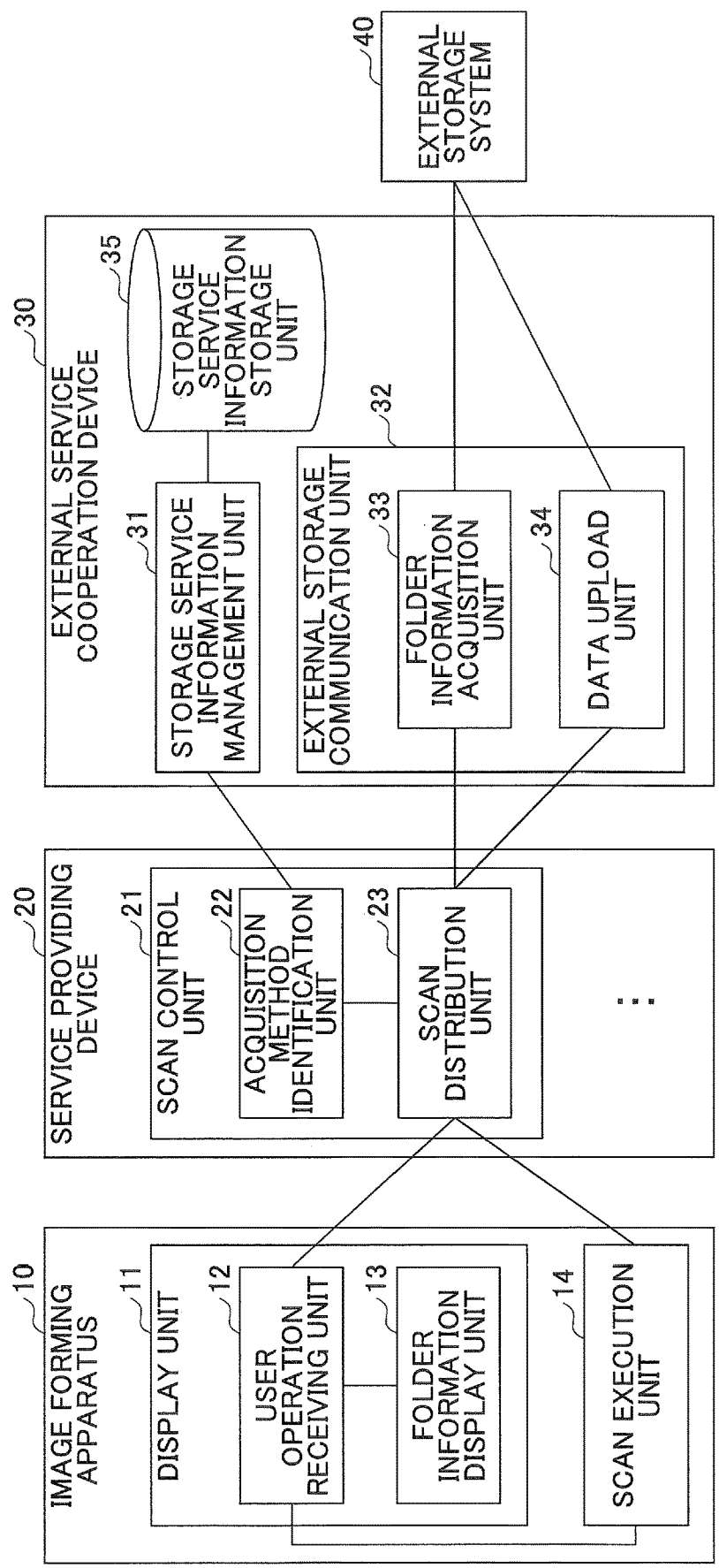
FIG. 4 is a process block diagram of an example of an information processing system according to the first embodiment.

Next, a description is given of a software configuration of the information processing system 1 according to the first embodiment. The information processing system 1 according to the first embodiment can be realized by, for example, the process blocks as illustrated in FIG. 4. FIG. 4 is a process block diagram of an example of the information processing system 1 according to the first embodiment.

The image forming apparatus 10 includes a display unit 11 and a scan execution unit 14. Furthermore, the display unit 11 includes a user operation receiving unit 12 and a folder information display unit 13.

The user operation receiving unit 12 is realized by, for example, the CPU 211, the operation panel 202, etc., and receives various operations by the user. For example, the user operation receiving unit 12 receives various operations such as an operation of specifying the storage service to be the storage destination of the image data, an operation of selecting (specifying) the folder to be the storage destination of the image data in the specified storage service, and an operation of executing scanning of an original document.

The folder information display unit 13 is realized by, for example, the CPU 211, the operation panel 202, etc., and displays a folder selection screen for selecting (specifying) the folder to be the storage destination of the image data, based on the folder information received from the service providing device 20.

The scan execution unit 14 is realized by, for example, the CPU 211, the scanner 205, etc., and generates image data by scanning an original document. Furthermore, the scan execution unit 14 requests (upload request) the service providing device 20 to store the generated image data in a specified storage destination folder in the specified storage service.

The service providing device 20 includes a scan control unit 21. Furthermore, the scan control unit 21 includes an acquisition method identification unit 22 and a scan distribution unit 23. Note that the service providing device 20 may include, for example, a print control unit for providing a service of acquiring (downloading) electronic data from the storage service and printing the data by the image forming apparatus 10.

The acquisition method identification unit 22 is realized by, for example, the CPU 106, etc., and refers storage service information 35D described below, and identifies the acquisition method for acquiring the folder information from the external storage system 40.

Generally, the folder information may be acquired with the use of a Web API that is disclosed by the external storage system 40; however, the method of acquiring the folder information differs according to the Web API that is disclosed by the external storage system 40. For example, there is an external storage system 40$_1$ that discloses a Web API that acquires folder information of folders in the hierarchy of the specified folder and in all hierarchies lower than that of the specified folder, while there is an external storage system 40$_2$ that does not disclose such a Web API and discloses a Web API for acquiring only the folder information of folders in the hierarchy of the specified folder and in one hierarchy lower than that of the specified folder. Therefore, in the present embodiment, the acquisition method identification unit 22 identifies the acquisition method for acquiring folder information from the corresponding external storage system 40.

In the following, it is assumed that the Web API for acquiring folder information, which is disclosed by the external storage system 40, is either "a Web API that acquires folder information of folders in the hierarchy of the specified folder and in all hierarchies lower than that of the specified folder" or "a Web API for acquiring only the folder information of folders in the hierarchy of the specified folder and in one hierarchy lower than that of the specified folder". However, the Web API for acquiring folder information is not limited to these; for example, the Web API may be "a Web API for acquiring only the folder information of folders in the hierarchy of the specified folder and in a predetermined number of hierarchies (for example, two hierarchies) lower than that of the specified folder". That is, the acquisition method for acquiring folder information from the external storage system 40 may be various kinds of acquisition methods other than the above.

The scan distribution unit 23 is realized by, for example, the CPU 106, the communication I/F 107, etc., and makes an acquisition request for folder information or an upload request for image data, to a folder information acquisition unit 33 or a data upload unit 34 of the external service cooperation device 30 described below, in response to a request from the image forming apparatus 10.

The external service cooperation device 30 includes a storage service information management unit 31 and an external storage communication unit 32. Furthermore, the external storage communication unit 32 includes a folder information acquisition unit 33 and a data upload unit 34. Furthermore, the external service cooperation device 30 uses a storage service information storage unit 35.

The storage service information management unit 31 is realized by, for example, the CPU 106, etc., and acquires the storage service information 35D from the storage service information storage unit 35 described below, in response to a request from the acquisition method identification unit 22 of the service providing device 20.

The folder information acquisition unit 33 is realized by, for example, the CPU 106, the communication I/F 107, etc., and makes an acquisition request for folder information to the external storage system 40, in response to request from the scan distribution unit 23 of the service providing device 20. Note that at this time, the folder information acquisition unit 33 makes an acquisition request in accordance with the acquisition method identified by the acquisition method identification unit 22 of the service providing device 20.

The data upload unit 34 is realized by, for example, the CPU 106, the communication I/F 107, etc., and makes a request to upload image data to the external storage system 40, in response to a request from the scan distribution unit 23 of the service providing device 20.

The storage service information storage unit 35 is realized by, for example, the HDD 108 or a storage device connected to the external service cooperation device 30 via a network, etc., and stores storage service information 35D.

Here, a description is given of a data configuration of the storage service information 35D. FIG. 5 is a configuration diagram of an example of storage service information 35D. As illustrated in FIG. 5, the storage service information 35D includes a "storage service name" indicating the name of the storage service provided by the external storage system 40, a "host name" for connecting to a storage service via the network N1, an "authentication method" used when using the storage service, and an "acquisition method of folder information" indicating the acquisition method for acquiring the folder information from the storage service. Note that the storage service information 35D may include data items other than the above, such as a data item of a storage service ID for uniquely identifying the storage service.

Here, the storage service in which "Bundle" is specified as the data item of "acquisition method of folder information" (for example, "storage1"), is a storage service that discloses a Web API that acquires folder information of folders in the hierarchy of the specified folder and in all hierarchies lower than that of the specified folder. Therefore, to this storage service, the folder information acquisition unit 33 of the external service cooperation device 30 makes an acquisition request to acquire folder information of folders in the hierarchy of the specified folder and in all hierarchies lower than that of the specified folder.

Meanwhile, the storage service in which "OnlySubFolder" is specified as the data item of "acquisition method of folder information" (for example, "storage2"), is a storage device that discloses a Web API for acquiring only the folder information of folders in the hierarchy of the specified folder and in one hierarchy lower than that of the specified folder. Therefore, to this storage service, the folder information acquisition unit 33 of the external service cooperation device 30 makes an acquisition request to acquire folder information of folders in the hierarchy of the specified folder and in one hierarchy lower than that of the specified folder.

<Details of Process>

Next, a description is given of details of the process of the information processing system 1 according to the first embodiment. With respect to the information processing system 1 according to the first embodiment, a description is given of a process performed in a case where the user stores image data, which has been generated by scanning an original document in the image forming apparatus 10, in a selected (specified) folder in the storage service (that is, a scan distribution process). At this time, the folder selection screen in the image forming apparatus 10 used by the user to select the folder to be the storage destination, is generated based on folder information acquired from the external storage system 40. In the following, the description of the acquisition method for acquiring folder information from the external storage system 40, is given separately for the case where the acquisition method is "Bundle" and for the case where the acquisition method is "OnlySubFolder".

Figure 6:
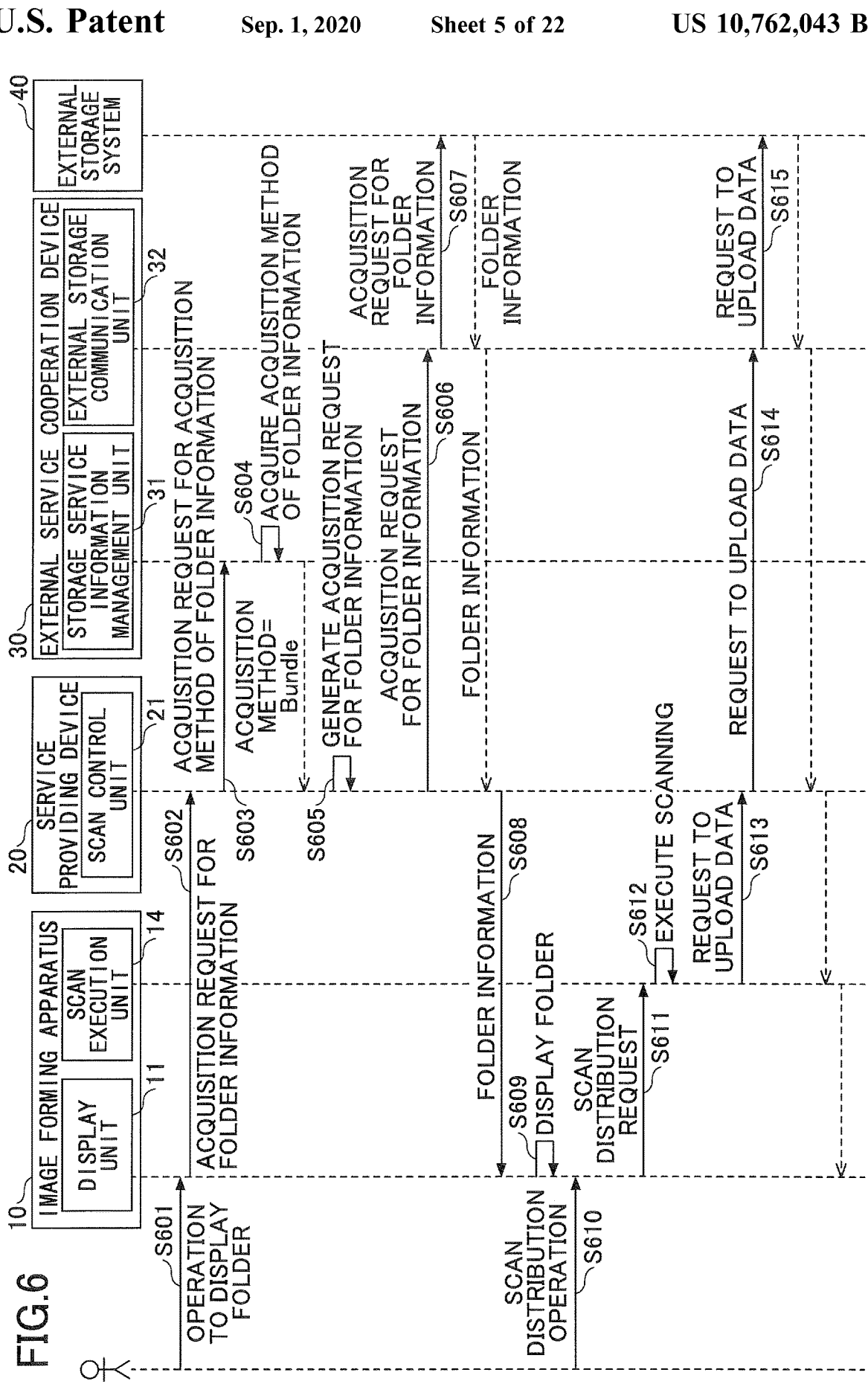
FIG. 6 is a sequence diagram of an example of a scan distribution process according to the first embodiment.
Figure 7:
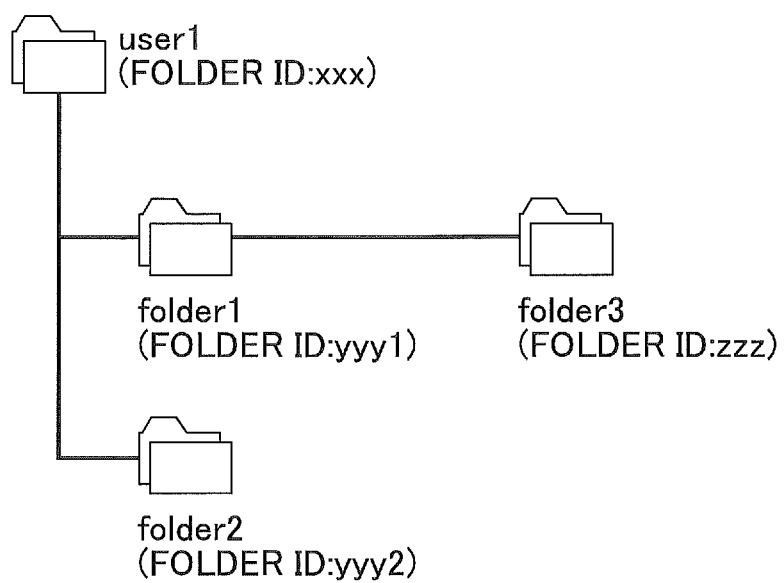
FIG. 7 illustrates an example of a hierarchal structure of folders in a storage service.

First, a description is given of a case where the user stores image data in a desired folder in the external storage system $40_1$ (the storage service "storage1" in which the acquisition method of the folder information is "Bundle"). FIG. 6 is a sequence diagram of an example of a scan distribution process according to the first embodiment. Here, the hierarchal structure of folders of the user in the external storage system $40_1$ is assumed to be as illustrated in FIG. 7. Also, it is assumed that the user is desiring to store the image data in the folder having the folder name "folder3".

In step S601, at the image forming apparatus 10, the user performs an operation for specifying a desired storage service and displaying a folder selection screen to be used for selecting the storage destination folder for the image data in the storage service. When the user performs this operation, the user operation receiving unit 12 of the image forming apparatus 10 receives the operation. In the present embodiment, it is assumed that the user has performed an operation for specifying a storage service name "storage1" and displaying a folder selection screen in the folder set as a default folder for the user (for example, the folder name "user1"). Note that, for example, when the user logs into the image forming apparatus 10, a storage service that is set in advance may be specified.

In step S602, when the above operation by the user is received, the user operation receiving unit 12 of the display unit 11 sends an acquisition request for folder information for displaying a folder selection screen on the operation panel 202, to the scan control unit 21 of the service providing device 20. Note that the acquisition request for folder information includes information relevant to the specified storage service (for example, a storage service name), and information relevant to the user (for example, a user name).

In step S603, when the acquisition request for the folder information is received, the scan distribution unit 23 of the scan control unit 21 requests the acquisition method identification unit 22 to identify the acquisition method of the folder information. Then, the acquisition method identification unit 22 sends an acquisition request for the acquisition method of the folder information, to the storage service information management unit 31 of the external service cooperation device 30. Note that the acquisition request includes information relevant to the specified storage service (for example, the storage service name).

In step S604, when the acquisition request for the acquisition method of the folder information is received, the storage service information management unit 31 refers to the storage service information 35D, and returns the storage service information of the corresponding storage service to the acquisition method identification unit 22. In the present embodiment, based on information relevant to the storage service included in the acquisition request for the acquisition method of the folder information (storage service name "storage1"), the record in the first line of the storage service information 35D is returned to the acquisition method identification unit 22. Here, the information returned to the acquisition method identification unit 22 is returned in, for example, the data format as illustrated in FIG. 8A. In FIG. 8A, in the storage service information 35D, the "storage service name" is specified as "name", the "host name" is specified as "host", the "authentication method" is specified as "auth_type", and the "acquisition method of folder information" is specified as "folder_acquisition_type". Accordingly, by referring to "folder_acquisition_type" in the information returned from the storage service information management unit 31, the acquisition method identification unit 22 is able to identify the acquisition method of the folder information of the specified storage service (storage service name "storage1").

Note that "oauth" specified in "auth_type" in FIG. 8A indicates that OAuth is used as the authentication method used when the user logs in the external storage system 40₁. By making a predetermined setting in advance by using OAuth as the authentication method, the user does not need to perform the authentication operation (for example, an operation of inputting a user name and a password) with respect to the external storage system 40₁ when displaying the folder selection screen.

In step S605, the scan distribution unit 23 of the scan control unit 21 generates an acquisition request for the folder information, based on the acquisition method of the folder information identified in step S604. The generated acquisition request for the folder information is described in, for example, a GET method of a HTTP (Hypertext Transfer Protocol) request as illustrated in FIG. 9A. In the URI (Uniform Resource Identifier) of the HTTP request illustrated in FIG. 9A, "folder_id=xxx" and "hierarchy=all" are specified. This indicates that this is a request to acquire folder information of folders in the hierarchy of the folder having a folder_ID "xxx" and in hierarchies lower than that of the folder having the folder ID "xxx", which is identification information uniquely applied to each folder. That is, when the acquisition method of the folder information identified in step S604 is "Bundle", the scan distribution unit 23 of the scan control unit 21 generates a HTTP request in which the "hierarchy" of the URI is specified as "all". As described below, the folder information is acquired by sending the above acquisition request for the folder information, to the host (www.storage1.com) acquired in step S604.

Note that as the folder ID specified in "folder_id", the folder ID of the folder that is set in advance as the default folder of the user (usually the folder at the highest hierarchy of the user), is specified. For example, when the hierarchy structure of the folders of the user in the external storage system 40₁ is as illustrated in FIG. 7, in "folder_id", the folder ID of the folder name "user1" is specified.

In step S606, the scan distribution unit 23 of the scan control unit 21 sends the acquisition request for the folder information generated in step S605, to the external storage communication unit 32 of the external service cooperation device 30.

In step S607, the folder information acquisition unit 33 of the external storage communication unit 32 sends the received acquisition request for the folder information, to the specified external storage system 40₁. That is, the folder information acquisition unit 33 of the external storage communication unit 32 sends the acquisition request for the folder information to the host acquired in step S604. Then, the external storage system 40₁ returns the corresponding folder information to the service providing device 20 via the external service cooperation device 30.

Here, the corresponding folder information is, for example as illustrated in FIG. 10, the folder information of folders in the hierarchy of the folder having the folder name "user1" and in all hierarchies lower than that of the folder having the folder name "user1". That is, the folder information is of the folders having the folder names "user1", "folder1", "folder2", and "folder3". As illustrated in FIG. 10, in the folder information, "id" indicating the folder ID, "name" indicating the folder name, "subfolders" specifying the folder information of a subfolder (a folder in one lower hierarchy), "path" indicating the path information (relative path) from the folder set as the default folder of the user, "has_subfolder" indicating whether there is a subfolder, etc., are specified. Here, when "true" is specified in "has_subfolder", this indicates that folder information of the subfolder is specified in "subfolders". Meanwhile, when "false" is specified in "has_subfolder", this indicates that folder information of the subfolder is not specified in "subfolders" (that is, there is no subfolder). That is, "has_subfolder" is a subfolder presence flag.

Note that, for example, when a service is provided by the service providing device 20 for printing the electronic data stored in the storage service by the image forming apparatus 10, the above folder information includes information relevant to the file stored in the folder. Therefore, in this case, the user can print a file by selecting the desired file in the file selection screen displayed on the image forming apparatus 10.

In step S608, the scan distribution unit 23 of the scan control unit 21 returns the received folder information to the display unit 11 of the image forming apparatus 10.

Figure 11A:
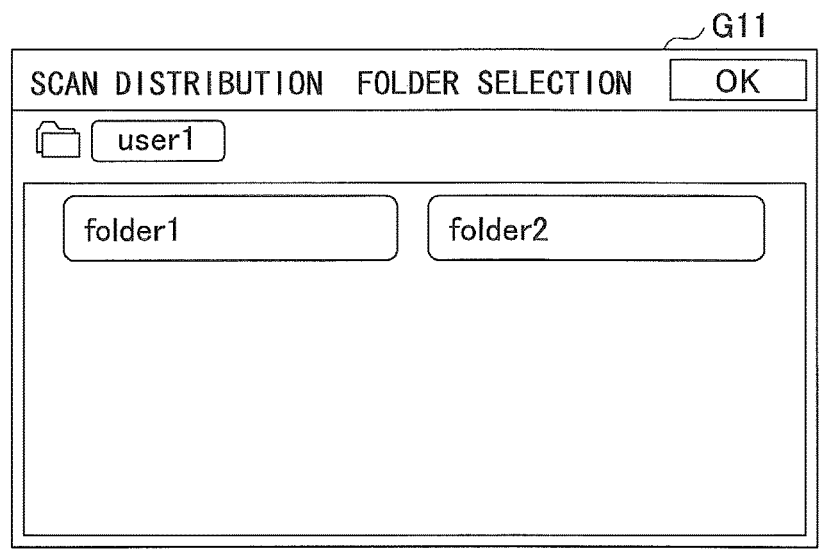
FIGS. 11A through 11C are image diagrams of examples of folder selection screens.
Figure 11B:
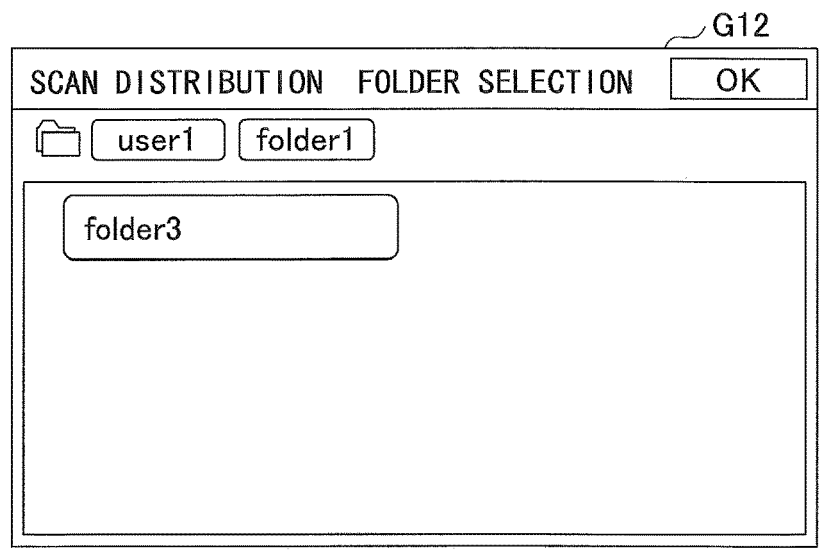
Figure 11C:
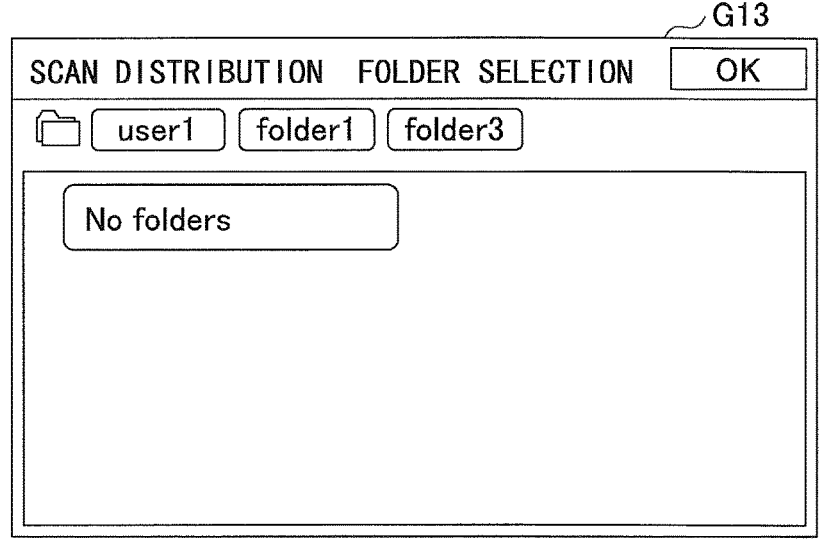

In step S609, when the user operation receiving unit 12 receives the folder information, the folder information display unit 13 of the display unit 11 generates, for example, folder selection screens G11 through G13 as illustrated in FIGS. 11A through 11C, based on the received folder information. Then, the folder information display unit 13 displays the folder selection screen G11 of FIG. 11A indicating a screen for selecting a folder in the folder name "user1".

In the folder selection screen G11 of FIG. 11A, when the user selects the folder name "folder1", the folder selection screen G12 as illustrated in FIG. 11B is displayed. Furthermore, in the folder selection screen G12 of FIG. 11B, when the user selects the folder name "folder3", the folder selection screen G13 as illustrated in FIG. 11C is displayed. Then, in the folder selection screen G13 of FIG. 11C, by selecting the "OK" button, the "folder3" is selected as the storage destination folder. In the folder "folder3" in the external storage system 40 selected as above, image data generated by a process described below, is stored.

Note that in the above, the folder selection screens G11 through G13 as illustrated in FIGS. 11A through 11C are generated in the image forming apparatus 10; however, these may be generated in the service providing device 20. That is, when the folder information is received from the external storage system 40 via the external service cooperation device 30, the service providing device 20 generates a folder selection screen from the received folder information. Then, the service providing device 20 may send the generated folder selection screen to the image forming apparatus 10.

In step S610, the user performs, at the image forming apparatus 10, an operation for performing scan distribution. This is an operation of, for example, selecting the "OK" button as described in step S609, in a state where the original document is set in the scanner of the image forming apparatus 10, to select "folder3" as the storage destination folder of the image data. Then, when the user performs this operation, the user operation receiving unit 12 of the image forming apparatus 10 receives this operation.

In step S611, when the operation by the user is received, the user operation receiving unit 12 requests the scan execution unit 14 to scan the original document and distribute the image data generated by the scanning operation. Note that this request includes information relevant to the specified storage service (for example, the storage service name), and information relevant to the folder that is the storage destination in the corresponding storage service selected by the user in step S609 (for example, the folder ID).

In step S612, the scan execution unit 14 scans the original document and generates image data.

In step S613, the scan execution unit 14 sends, to the scan control unit 21 of the service providing device 20, an upload request for storing the image data generated in step S612, in the selected folder in the specified storage service. Note that the upload request includes information relevant to the specified storage service, information relevant to the folder in the selected storage destination, and image data generated by the scan execution unit 14 in step S612.

In step S614, the scan distribution unit 23 of the scan control unit 21 sends the upload request received from the image forming apparatus 10 to the external storage communication unit 32 of the external service cooperation device 30.

In step S615, the data upload unit 34 of the external storage communication unit 32 sends, to the external storage system $40_1$, an upload request including the information relevant to the folder that is the storage destination and the generated image data. Accordingly, the image data, which has been generated by scanning the original document, is stored in the selected folder in the specified external storage system $40_1$.

As described above, the information processing system 1 according to the present embodiment can store data in the external storage system 40 that can collectively acquire folder information of folders in the hierarchy of the specified folder and in all hierarchies lower than that of the specified folder.

Figure 12:
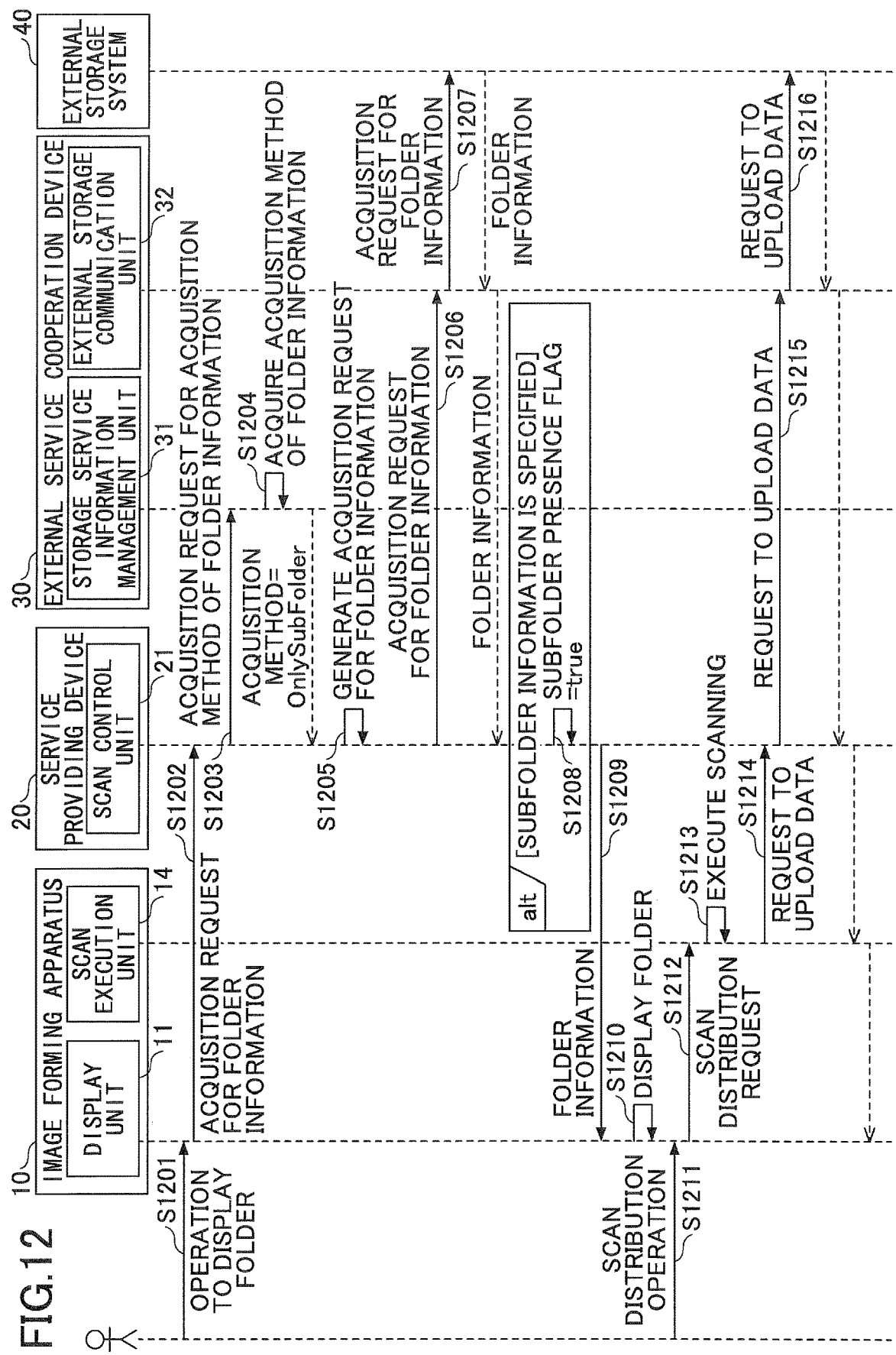
FIG. 12 is a sequence diagram of another example of a scan distribution process according to the first embodiment.

Next, a description is given of a case where the user desires to store image data in the external storage system $40_2$ (the storage service in which the acquisition method of the folder information is "OnlySubFolder"). FIG. 12 is a sequence diagram of another example of a scan distribution process according to the first embodiment. Here, the hierarchal structure of folders of the user in the external storage system $40_2$ is assumed to be as illustrated in FIG. 7, similar to the external storage system $40_1$. Also, it is assumed that the user is desiring to store the image data in the folder having the folder name "folder3".

Figure 13:
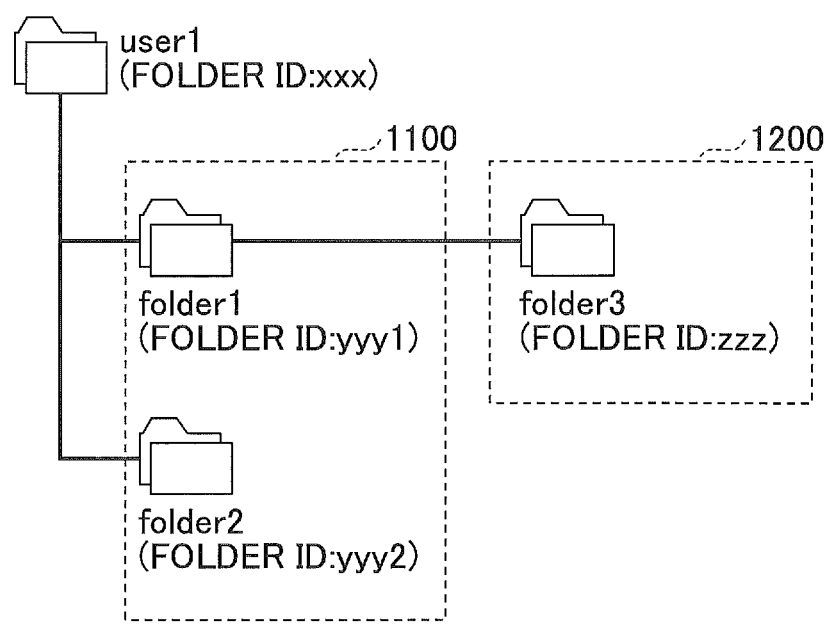
FIG. 13 illustrates an example of hierarchies of folder information that are acquired.

Note that when the acquisition method of the folder information is "OnlySubFolder", the folder information is acquired in units of one hierarchy. Therefore, when the folder information is acquired by specifying the folder ID "user1", the folder information of the folders within the range indicated by a dotted line 1100 in FIG. 13 (that is, the folders immediately below "user1") is acquired. Furthermore, when the folder information is acquired by specifying the folder ID "folder1", the folder information of the folder within the range indicated by a dotted line 1200 in FIG. 13 (that is, the folder immediately below "folder1") is acquired. As described above, when the acquisition method of the folder information is "OnlySubFolder", the folder information to be acquired is the folder information of the specified folder ID and the folder information of the folder immediately below the specified folder ID.

In step S1201, at the image forming apparatus 10, the user performs an operation for specifying a desired storage service and displaying a folder selection screen to be used for selecting the storage destination folder for the image data in the storage service. When the user performs this operation, the user operation receiving unit 12 of the image forming apparatus 10 receives the operation. In the present embodiment, it is assumed that the user has performed an operation for specifying a storage service name "storage2" and displaying a folder selection screen G11 in the folder set as a default folder for the user (for example, the folder name "user1"). Note that, for example, when the user logs into the image forming apparatus 10, a storage service that is set in advance may be specified.

Steps S1202 through S1204 are the same as steps S602 through S604 of FIG. 6, and therefore descriptions thereof are omitted. However, in step S1204, the storage service information management unit 31 of the service providing device 20 returns, to the acquisition method identification unit 22, the record in the second line of the storage service information 35D, based on the storage service name "storage2" specified by the user. That is, for example, the storage service information management unit 31 returns information in a data format as illustrated in FIG. 8B, to the acquisition method identification unit 22. As illustrated in FIG. 8B, at "folder_acquisition_type", "OnlySubFolder" indicating the acquisition method of the folder is specified, and by referring to this, the acquisition method identification unit 22 can identify the acquisition method of the folder information of the specified storage service (storage service name "storage2").

In step S1205, the scan distribution unit 23 of the scan control unit 21 generates an acquisition request for the folder information, based on the acquisition method of the folder information identified in step S1204. The acquisition request for the folder information generated here is described in, for example, a GET method of a HTTP request as illustrated in FIG. 9B. In the URI of the HTTP request illustrated in FIG. 9B, "folder_id=xxx" and "hierarchy=1" are specified. This indicates that this is a request to acquire the folder information of folders in the hierarchy of the folder having a folder ID "xxx" and in one hierarchy lower than this hierarchy (that is, the folder having a folder ID "xxx" and the folders immediately below this folder). That is, when the acquisition method of the folder information identified in step S1204 is "OnlySubFolder", the scan distribution unit 23 of the scan control unit 21 generates a HTTP request in which the "hierarchy" of the URI is specified as "1". As described below, the folder information is acquired by sending the above acquisition request for the folder information, to the host (www.storage2.co.jp) acquired in step S1204.

In step S1206, the scan distribution unit 23 of the scan control unit 21 sends the acquisition request for the folder information generated in step S1205, to the external storage communication unit 32 of the external service cooperation device 30.

In step S1207, the folder information acquisition unit 33 of the external storage communication unit 32 sends the received acquisition request for the folder information, to the specified external storage system 40₂. That is, the folder information acquisition unit 33 of the external storage communication unit 32 sends the acquisition request for the folder information to the host acquired in step S1204. Then, the external storage system 40₂ returns the corresponding folder information to the service providing device 20 via the external service cooperation device 30.

Here, the corresponding folder information is, for example, as illustrated in FIG. 14A, the folder information of folders in the hierarchy of the folder having the folder name "user1" and in one hierarchy lower than that of the folder having the folder name "user1". That is, the folder information is that of the folder having the folder name "user1", and the folders having the folder names "folder1" and "folder2", which are immediately below the folder "user1". As described above, when "hierarchy=1" is specified in the URI of the acquisition request for folder information, the folder information of folders including those that are immediately below the folder having the folder ID specified in "folder_id", is acquired. Note that in this case, in the folder information of "folder1" and "folder2", "false" is specified in the subfolder presence flags 2100 and 2200, respectively.

Furthermore, when the corresponding folder information is returned, the scan distribution unit 23 determines whether subfolder information is specified in the specified folder ID. Then, when the subfolder information is specified, the process of step S1208 is performed.

For example, when folder information as illustrated in FIG. 14A is returned, in the specified folder ID "xxx" (folder name "user1"), the folder information of "folder1" and "folder2" is specified as "subfolder" (that is, subfolder information), and therefore the process of step S1208 is performed. Meanwhile, for example, when folder information as illustrated in FIG. 14C is returned, in the specified folder ID "zzz" (folder name "folder3"), "subfolder" is not specified, and therefore the process of step S1208 is not performed. Note that the folder information illustrated in FIG. 14C is folder information that is acquired when the user selects the folder having the folder name "folder3" in the folder selection screen G1, as described below.

In step S1208, the scan distribution unit 23 rewrites the subfolder presence flag in the subfolder information specified in "subfolder" in the folder information, to "true". That is, for example, in the case of the folder information as illustrated in FIG. 14A, the subfolder presence flags 2100, 2200 are rewritten into "true" from "false". Furthermore, in the case of the folder information as illustrated in FIG. 14B, the subfolder presence flag 2300 is rewritten into "true" from "false".

This is because the image forming apparatus 10 that has received the folder information may refer to the subfolder presence flag in the folder information and determine whether there is a folder in a further lower hierarchy. That is, this is to prevent a situation where, even though actually there is a folder in a further lower hierarchy, it is erroneously determined that there is no folder in the further lower hierarchy because the subfolder presence flag is indicating "false".

In step S1209, the scan distribution unit 23 of the scan control unit 21 returns folder information to the display unit 11 of the image forming apparatus 10. Here, the folder information returned to the display unit 11 of the image forming apparatus 10 is the folder information after the subfolder presence flag has been rewritten, when the process of step S1208 has been performed.

In step S1210, when the user operation receiving unit 12 receives the folder information, the folder information display unit 13 of the display unit 11 generates a folder selection screen G11, for example, as illustrated in FIG. 11A, based on the received folder information. Then, the folder information display unit 13 displays the folder selection screen G11 illustrated in FIG. 11A indicating a screen for selecting a folder in the folder name "user1".

Note that as described above, at this time, the folder information display unit 13 may refer to the subfolder presence flag in the received folder information, and determine whether there is a folder in a further lower hierarchy. Then, according to the determination result, for example, the image forming apparatus 10 may send a request to acquire folder information of a folder in a further lower hierarchy, to the service providing device 20.

Next, when the user selects, for example, a folder name "folder1" in the folder selection screen G11 illustrated in FIG. 11A, the processes of steps S1202 through S1210 as described above are executed, and a folder selection screen G12 as illustrated in FIG. 11B is displayed. That is, in this case, in step S1205, an acquisition request is generated to acquire the folder information in which the folder ID "yyy1" of the "folder1" is specified as "folder_id". Then, in step S1207, for example, as illustrated in FIG. 14B, the folder information of the folder having the folder name "folder1" and the folder having the folder name "folder3" immediately below the folder "folder1", is acquired. Then, in step S1210, a folder selection screen G12 as illustrated in FIG. 11B is displayed.

Similarly, for example, when the user selects a folder name "folder3" in the folder selection screen G12 illustrated in FIG. 11B, the processes of steps S1202 through S1210 as described above are executed, and a folder selection screen G13 as illustrated in FIG. 11C is displayed. Then, as the user selects the "OK" button in FIG. 11C, the "folder3" is selected as the storage destination folder.

Note that the subsequent processes of steps S1211 through S1216 are the same as the processes of steps S610 through S615 in FIG. 6, and therefore descriptions thereof are omitted.

As described above, the information processing system 1 according to the present embodiment can store data in the external storage system 40 that can acquire folder information of the specified folder and folders in one hierarchy lower than that of the specified folder. At this time, the information processing system 1 according to the present embodiment performs the generating and the displaying of a folder selection screen, for each folder information that is acquired (that is, in units of folders in one hierarchy). Therefore, even when the user desires to store the data in an external storage system 40 that cannot collectively acquire folder information of folders in the hierarchy of the specified folder and in all hierarchies lower than that of the specified folder (that is, an external storage system 40 that can only acquire the folder information in units of one hierarchy), it is possible to display a folder selection screen without delay. Accordingly, the user's waiting time is reduced, and the user can perform the operation of selecting a folder to be the storage destination in a stress-free manner.

Second Embodiment

Figure 15:
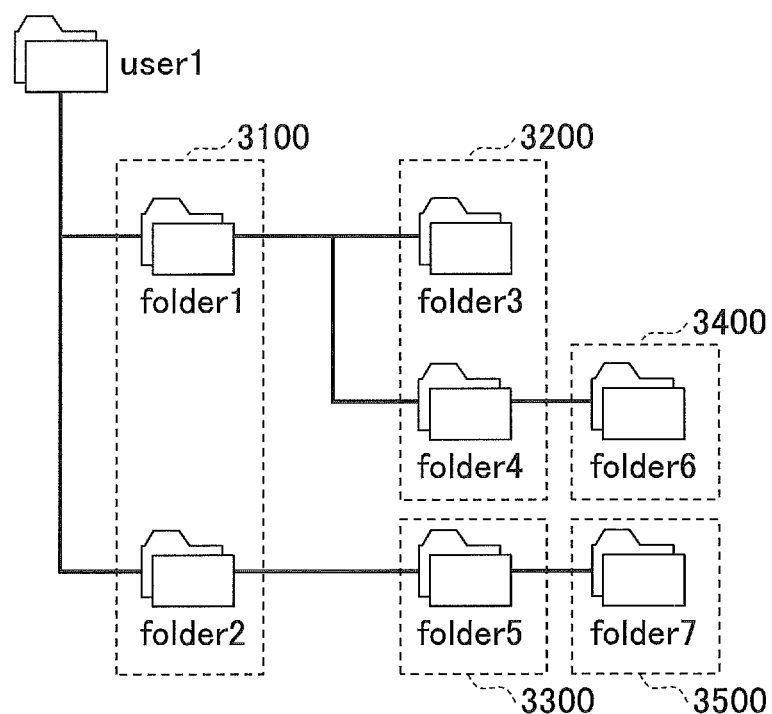
FIG. 15 illustrates the acquisition of folder information in an information processing system according to a second embodiment.

Next, a description is given of the information processing system 1 according to a second embodiment. In the information processing system 1 according to the second embodiment, in the external storage system 40 for which the method of acquiring the folder information is "OnlySubFolder", the folder information is sequentially acquired in the background and is cached. That is, for example, it is assumed that the hierarchy structure of folders of the user in the external storage system 40₂ is as illustrated in FIG. 15. Here, when the folder information in the range indicated by a dotted line 3100 has already been acquired, and a folder selection screen for selecting "folder1" and "folder2" is displayed on the image forming apparatus 10, the information processing system 1 according to the second embodiment acquires the folder information in the ranges indicated by dotted lines 3200 through 3500 in the background and caches the acquired folder information. Then, for example, when "folder1" is selected and an operation to display a folder selection screen for selecting "folder3" and "folder4" is performed at the image forming apparatus 10, the cached folder information in the range indicated by the dotted line 3200 is returned to the image forming apparatus 10. Note that in the following, elements having substantially the same functions as those of the first embodiment and processes that are substantially the same as those of the first embodiment are denoted by the same reference numerals and descriptions thereof are omitted.

<Software Configuration>

Figure 16:
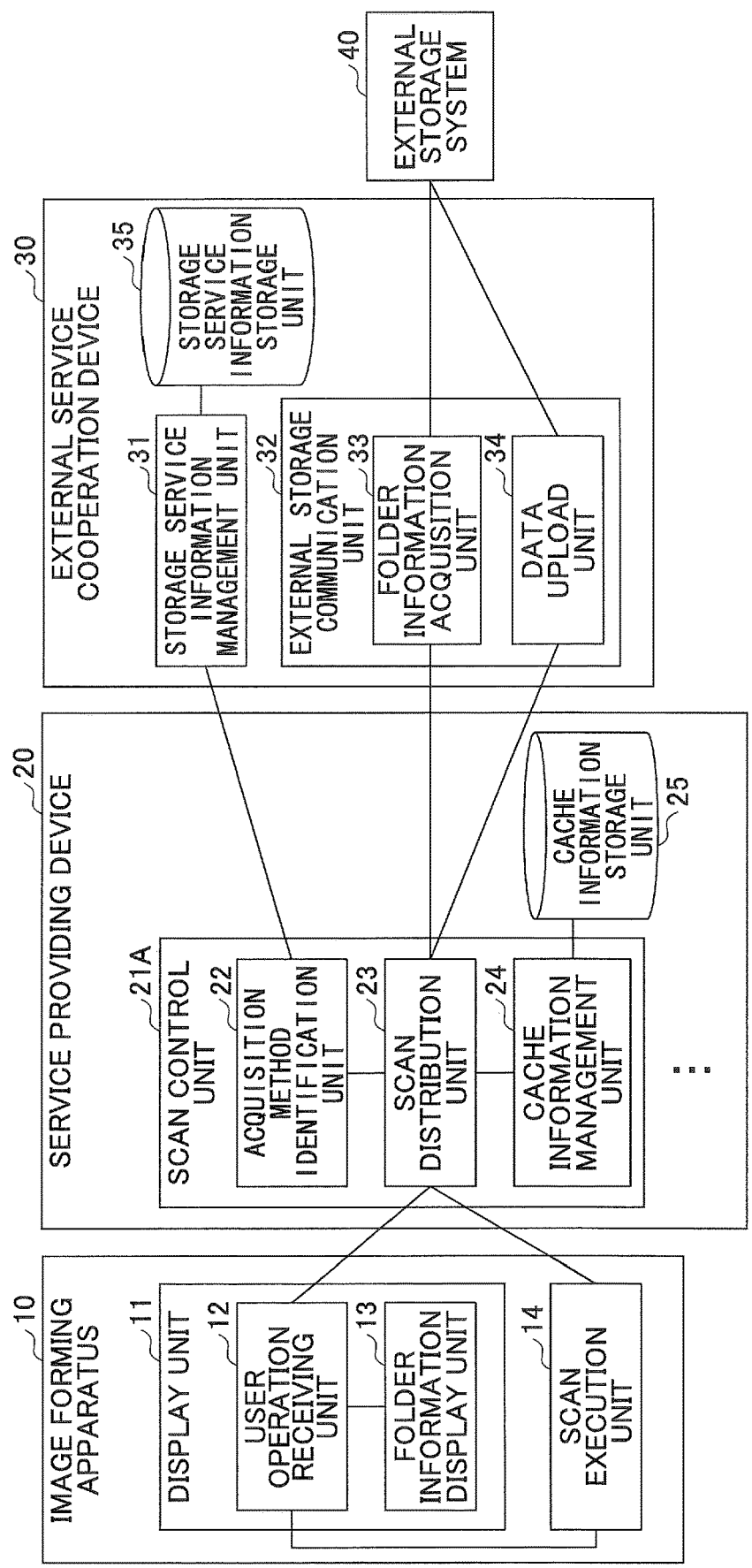
FIG. 16 is a process block diagram of an example of the information processing system according to the second embodiment.

First, a description is given of a software configuration of the information processing system 1 according to the second embodiment. The information processing system 1 according to the second embodiment can be realized by, for example, the process blocks as illustrated in FIG. 16. FIG. 16 is a process block diagram of an example of the information processing system 1 according to the second embodiment. The information processing system 1 according to the second embodiment is different from that of the first embodiment in that a scan control unit 21A further includes a cache information management unit 24. Furthermore, the service providing device 20 according to the second embodiment is different from that of the first embodiment in that it uses a cache information storage unit 25.

The cache information management unit 24 is realized by, for example, the CPU 106, etc., and stores folder information acquired from the external storage system 40 via the external service cooperation device 30, in the cache information storage unit 25 as a cache. Furthermore, in response to a request from the scan distribution unit 23, the cache information management unit 24 acquires folder information stored as cache.

The cache information storage unit 25 is realized by, for example, the HDD 108 or a storage device, etc., connected to the service providing device 20 via a network, and stores folder information acquired from the external storage system 40 via the external service cooperation device 30, as cache.

<Details of Process>

Figure 17:
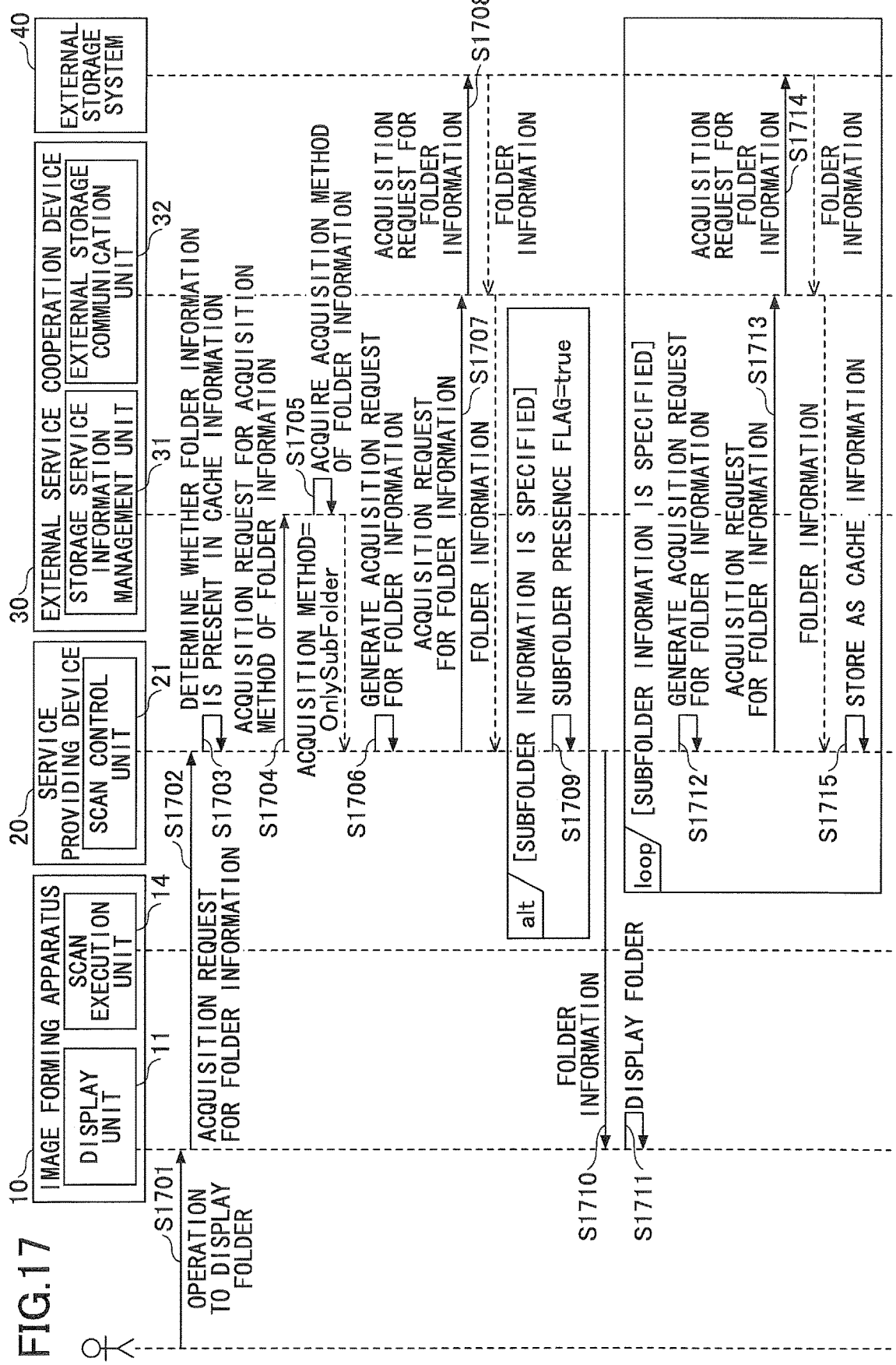
FIG. 17 is a sequence diagram of an example of a scan distribution process according to the second embodiment.

Next, a description is given of details of the process of the information processing system 1 according to the second embodiment. In a scan distribution process according to the second embodiment, as described above, in the external storage system 40 for which the method of acquiring the folder information is "OnlySubFolder", the folder information is sequentially acquired in the background and is cached. Therefore, in the following, a description is given of a case where the acquisition method for acquiring folder information from the external storage system 40 is "OnlySubFolder". FIG. 17 is a sequence diagram of an example of a scan distribution process according to the second embodiment. Note that in FIG. 17, the processes described with respect to steps S610 through S615 of FIG. 6 are omitted.

Steps S1701 and S1702 are the same as steps S1201 and S1202 of FIG. 12, and therefore descriptions thereof are omitted.

In step S1703, the scan distribution unit 23 of the scan control unit 21A requests the cache information management unit 24 to determine whether the corresponding folder information (for example, folder information of the folder set as the default folder of the user and folder information of the folder selected in the folder selection screen) is included in the cache information storage unit 25. Then, the cache information management unit 24 determines whether the corresponding folder information is included in the cache information storage unit 25.

Here, when the corresponding folder information is included in the cache information storage unit 25, the subsequent processes are not performed, and the corresponding folder information is returned to the image forming apparatus 10. Then, the display unit 11 of the image forming apparatus 10 displays a folder selection screen based on the received folder information. In the following, the description is continued assuming that it is determined that the corresponding folder information is not included in the cache information storage unit 25.

Steps S1704 through S1711 are the same as steps S1203 through S1210 of FIG. 12, and therefore descriptions thereof are omitted. Accordingly, for example, the folder selection screen G11 as illustrated in FIG. 11A is displayed on the image forming apparatus 10. At this time, as described in the next steps S1712 through S1715, the service providing device 20 acquires folder information in the background from the external storage system 40 via the external service cooperation device 30, and stores the acquired folder information as a cache in the cache information storage unit 25.

In step S1712, the scan distribution unit 23 of the scan control unit 21 generates an acquisition request for folder information. Here, the generated acquisition request for folder information is, for example, an acquisition request for acquiring the folder information in the range indicated by the dotted line 3200 in FIG. 15, when the folder information in the range indicated by the dotted line 3100 in FIG. 15 is already acquired. Furthermore, when the folder information in the ranges indicated by the dotted lines 3100 and 3200 in FIG. 15 is already acquired, the generated acquisition request is for acquiring the folder information in the range indicated by the dotted line 3300. Furthermore, when the folder information in the ranges indicated by the dotted lines 3100 through 3300 in FIG. 15 is already acquired, the generated acquisition request is for acquiring the folder information in the range indicated by the dotted line 3400. As described above, for example, the acquisition requests for the folder information are generated in the order for acquiring the range indicated by the dotted line 3100, the range indicated by the dotted line 3200, the range indicated by the dotted line 3300, the range indicated by the dotted line 3400, and the range indicated by the dotted line 3500 in FIG. 15. Therefore, the acquiring of the folder information is also performed in this order, in the next step S1714.

Figure 18:
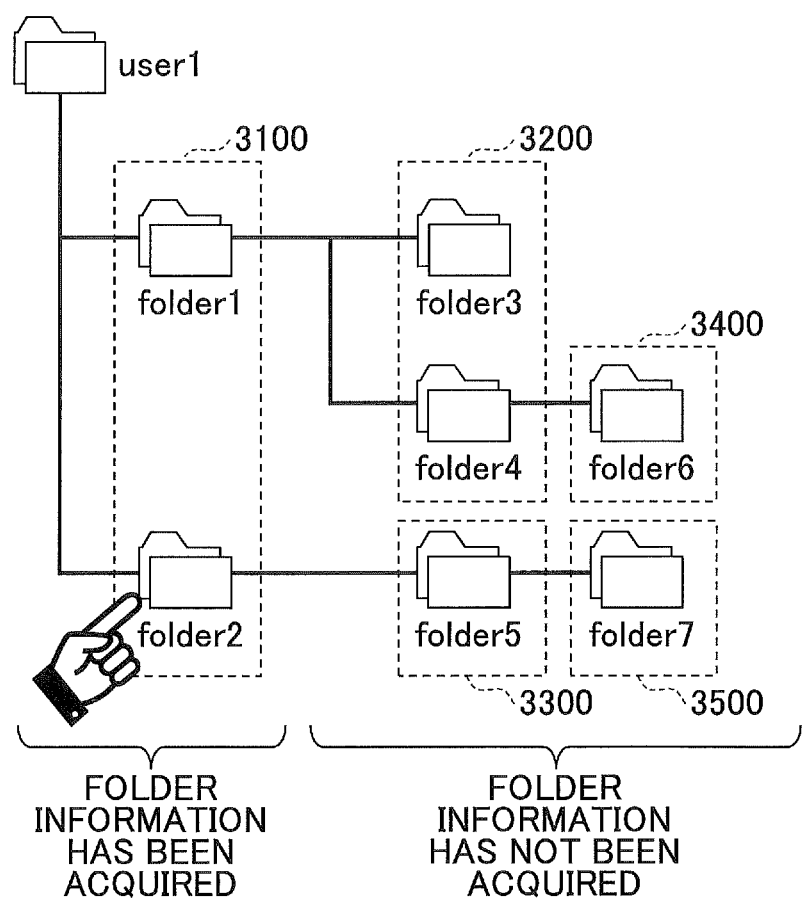
FIG. 18 illustrates another example of hierarchies of folder information that are acquired.

However, the order in which the acquisition requests for folder information are generated (that is, the order in which the folder information is acquired) is not so limited, and the acquisition requests may be generated (the folder information may be acquired) in a predetermined priority order. For example, as illustrated in FIG. 18, when the user is displaying a folder selection screen for selecting a folder in a folder name "folder3" at the image forming apparatus 10, the predetermined priority order may be to prioritize the generation of the acquisition requests for the folder information of the folders in the ranges indicated by the dotted lines 3300 and 3500 that are lower than the hierarchy of the "folder3". Otherwise, for example, the acquisition requests for the folder information may be generated in a priority order according to an ascending order or descending order of folder IDs.

In step S1713, the scan distribution unit 23 of the scan control unit 21A sends the acquisition request for the folder information generated in step S1712, to the external storage communication unit 32 of the external service cooperation device 30.

Note that when the information processing system 1 includes two or more service providing devices 20, one service providing device 20 may request the other service providing device 20 to perform the processes of steps S1712 and S1713. Then, the one service providing device 20 may store (merge) the folder information acquired by the other service providing device 20 in the cache information storage unit 25 of itself. That is, a plurality of service providing devices 20 may acquire folder information in a manner as to supplement each other, and the acquired folder information may be stored in a single cache information storage unit 25.

In step S1714, the folder information acquisition unit 33 of the external storage communication unit 32 sends the received acquisition request for the folder information to the specified external storage system 40₁. Then, the external storage system 40 returns the corresponding folder information to the service providing device 20 via the external service cooperation device 30.

In step S1715, the scan distribution unit 23 of the scan control unit 21A requests the cache information management unit 24 to store the folder information acquired in step S1714. Then, the cache information management unit 24 causes the cache information storage unit 25 to store the folder information as a cache. Note that at this time, the cache information management unit 24 may store, in association with the folder information, the path information of the absolute path of the storage destination of the folder in the external storage system 40 (that is, the relative path from the root folder), or the path information of the relative path from the parent folder. Accordingly, for example, when the user specifies the path information of the folder to be displayed at the image forming apparatus 10, it is possible to reduce the waiting time of the user until the specified folder selection screen is displayed.

The processes of steps S1712 through S1715 as described above are repeated while the subfolder information is specified in the acquired folder information (that is, while the subfolder presence flag of the folder information of the specified folder ID is indicating "true"). Accordingly, for example, the folder information in the ranges indicated by dotted lines 3200 through 3500 in FIG. 15 is sequentially acquired and stored as a cache in the cache information storage unit 25.

Note that when the information processing system 1 includes two or more service providing devices 20, the cache information storage units 25 of the respective service providing devices 20 may be synchronized at a predetermined timing (for example, the contents of the cache information storage units 25 of the respective service providing device 20 may be merged or supplement each other).

Note that as described above, when the user selects a desired folder after the folder selection screen is displayed in step S1711, the processes of steps S610 through S615 described with reference to FIG. 16 are performed.

As described above, the information processing system 1 according to the present embodiment can store data in the external storage system 40 that can acquire folder information of the specified folder and folders in one hierarchy lower than that of the specified folder. At this time, the information processing system 1 according to the present embodiment acquires the folder information in units of one hierarchy in the background, and stores the acquired folder information as a cache in the cache information storage unit 25. Accordingly, when an acquisition request for cached folder information is received from the image forming apparatus 10, the user's waiting time until the folder selection screen is displayed can be further reduced.

<Overview>

According to the information processing system 1 according to the first embodiment described above, even when the user desires to store the data in an external storage system 40 that cannot collectively acquire folder information of folders in the hierarchy of the specified folder and in all hierarchies lower than that of the specified folder (that is, the external storage system 40 that can only acquire the folder information in units of a predetermined number of hierarchies (for example, in units of one hierarchy)), it is possible to display a folder selection screen for selecting the folder to be the storage destination without delay. Therefore, the user's waiting time until the folder selection screen is displayed is reduced. Accordingly, the user can comfortably use the external storage system 40 from the image forming apparatus 10.

Furthermore, according to the information processing system 1 according to the second embodiment described above, when it is not possible to collectively acquire the folder information of the specified folder and folders lower than the specified folder, the folder information is acquired in the background and the acquired folder information is stored as a cache. Therefore, the user's waiting time until the folder selection screen is displayed is further reduced.

Note that in the description of the first and second embodiments, the image data scanned in the image forming apparatus 10 (example of an image processing apparatus) that is an input source, is stored in the external storage system 40 that is an output destination; however, embodiments of the present invention are not so limited. For example, the input source is not limited to a scanned object; the input source may be image data captured by a digital camera, a mobile phone, etc., or various kinds of electronic data other than image data such as document data created by a PC, voice sound data created by an IC recorder, etc. Furthermore, the output destination may be, for example, an image projection device such as a projector, a digital signage panel, a printer, a conference system, etc.

Furthermore, as the input source or the output source of the electronic data, other devices may be used to implement services having same purposes as those of the present embodiment, as long as the device can function as an input unit or an output unit of electronic data.

Third Embodiment

Next, a description is given of the information processing system 1 according to a third embodiment. In the information processing system 1 according to the third embodiment, the service providing device 20 and the external service cooperation device 30 are constituted by a single information processing apparatus. Furthermore, in the information processing system 1 according to the third embodiment, an image that is captured by a digital camera is uploaded in the external storage system 40. Note that in the following, elements having substantially the same functions as those of the first embodiment and processes that are substantially the same as those of the first embodiment are denoted by the same reference numerals and descriptions thereof are omitted.

<System Configuration>

Figure 19:
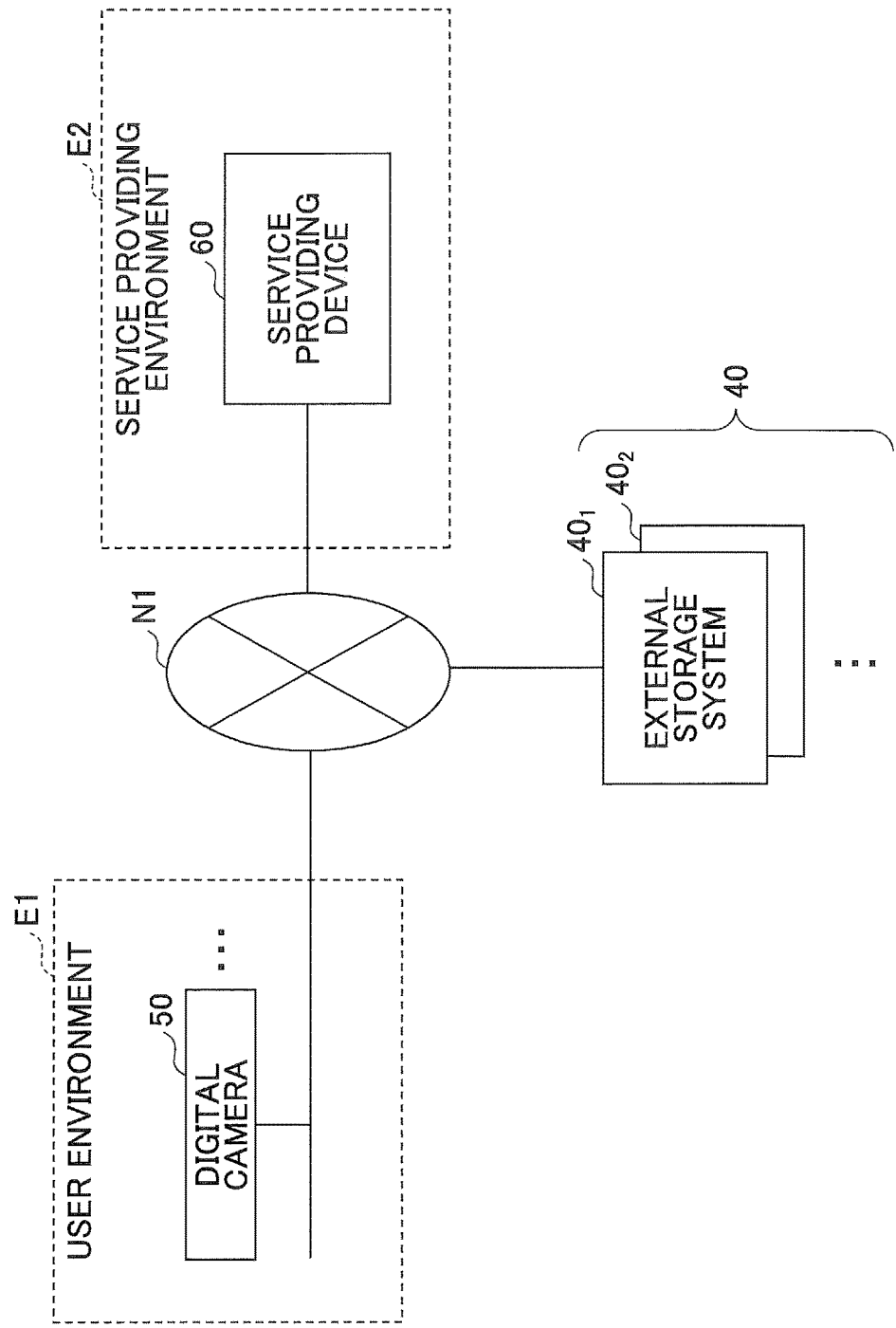
FIG. 19 is a configuration diagram of an example of an information processing system according to a third embodiment.

First, a description is given of a system configuration of an information processing system 1 according to a third embodiment. FIG. 19 is a configuration diagram of an example of an information processing system according to a third embodiment.

The information processing system 1 according to the third embodiment is different from that of the first embodiment in that the user environment E1 includes a digital camera 50 and the service providing environment E2 includes a service providing device 60.

The user environment E1 includes one or more digital cameras 50, which is connected to a network such as wireless LAN. The digital camera 50 is a device that is used by the user. The user can store image data, which is selected at the digital camera 50, in a specified storage destination in the external storage system 40 (a specified folder in the external storage system 40).

The service providing environment E2 includes the service providing device 60. The service providing device 60 provides a service of storing the image data selected at the digital camera 50 in the user environment E1, in a specified storage destination in the external storage system 40. In this case, for example, the service providing device 60 acquires folder information for specifying a folder to be the storage destination of the image data, from the external storage system 40.

That is, the service providing device 60 according to the third embodiment is formed by constituting the service providing device 20 according to the first embodiment and the external service cooperation device 30 according to the first embodiment by a single information processing apparatus.

<Hardware Configuration>

Figure 20:
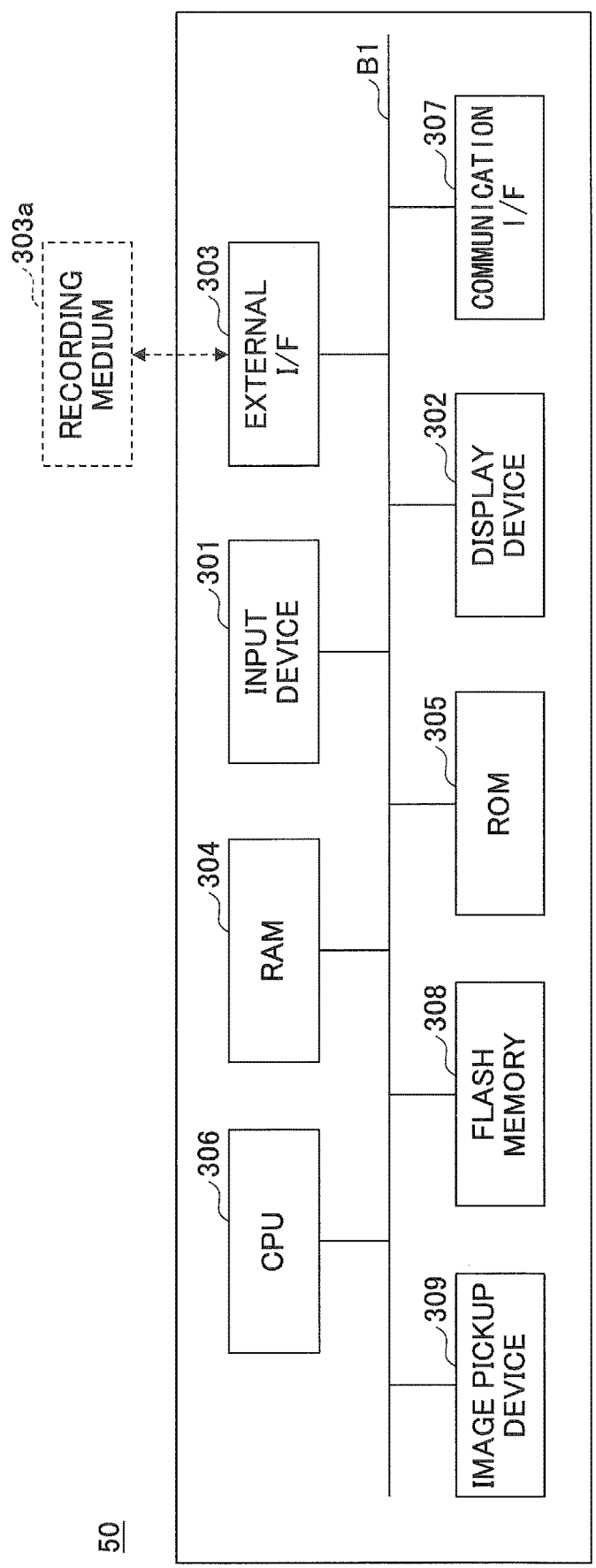
FIG. 20 is a hardware configuration diagram of an example of a digital camera according to the third embodiment.

Next, a description is given of a hardware configuration of the digital camera 50 included in the information processing system 1 according to the third embodiment. FIG. 20 is a hardware configuration diagram of an example of the digital camera 50 according to the third embodiment.

The digital camera 50 illustrated in FIG. 20 includes an input device 301, a display device 302, an external I/F 303, a RAM 304, a ROM 305, a CPU 306, a communication I/F 307, a flash memory 308, and an image pickup device 309. These hardware elements are connected to each other by a bus B1.

The input device 301 includes a touch panel, various buttons, etc., and is used by the user for inputting various operation signals. The display device 302 includes a display, etc., and displays processing results obtained by the digital camera 50.

The communication I/F 307 is an interface that connects the digital camera 50 to the network N1. Accordingly, the digital camera 50 is able to perform data communication via the communication I/F 307.

The external I/F 303 is an interface between the digital camera 50 and an external device. An example of the external device is a recording medium 303a. Accordingly, the digital camera 50 is able to read and/or write in the recording medium 303a via the external I/F 303.

Examples of the recording medium 303a are a SD memory card, a USB memory, etc. In the recording medium 303a, for example, image data generated by the image pickup device 309 is stored.

The flash memory 308 is an example of a non-volatile storage device for storing programs, etc., for controlling the entire digital camera 50. The ROM 305 is a non-volatile semiconductor memory (storage device) that can store programs and data even after the power is turned off. The ROM 305 stores various kinds of setting information, etc. The RAM 304 is a volatile semiconductor memory (storage device) for temporarily storing programs and data.

The CPU 306 is a processor for controlling the entire digital camera 50 and implementing functions of the digital camera 50, by loading the programs and data from the ROM 305 and the flash memory 308 into the RAM 304, and executing processes.

The image pickup device 309 generates image data by capturing an object. The image data generated by the image pickup device 309 is not limited to image data of a still image; the image data may be a video image (that is, video data). That is, the image data includes image data of a still image and image data of a video.

The digital camera 50 can implement various process described below by the above hardware configuration.

<Software Configuration>

Figure 21:
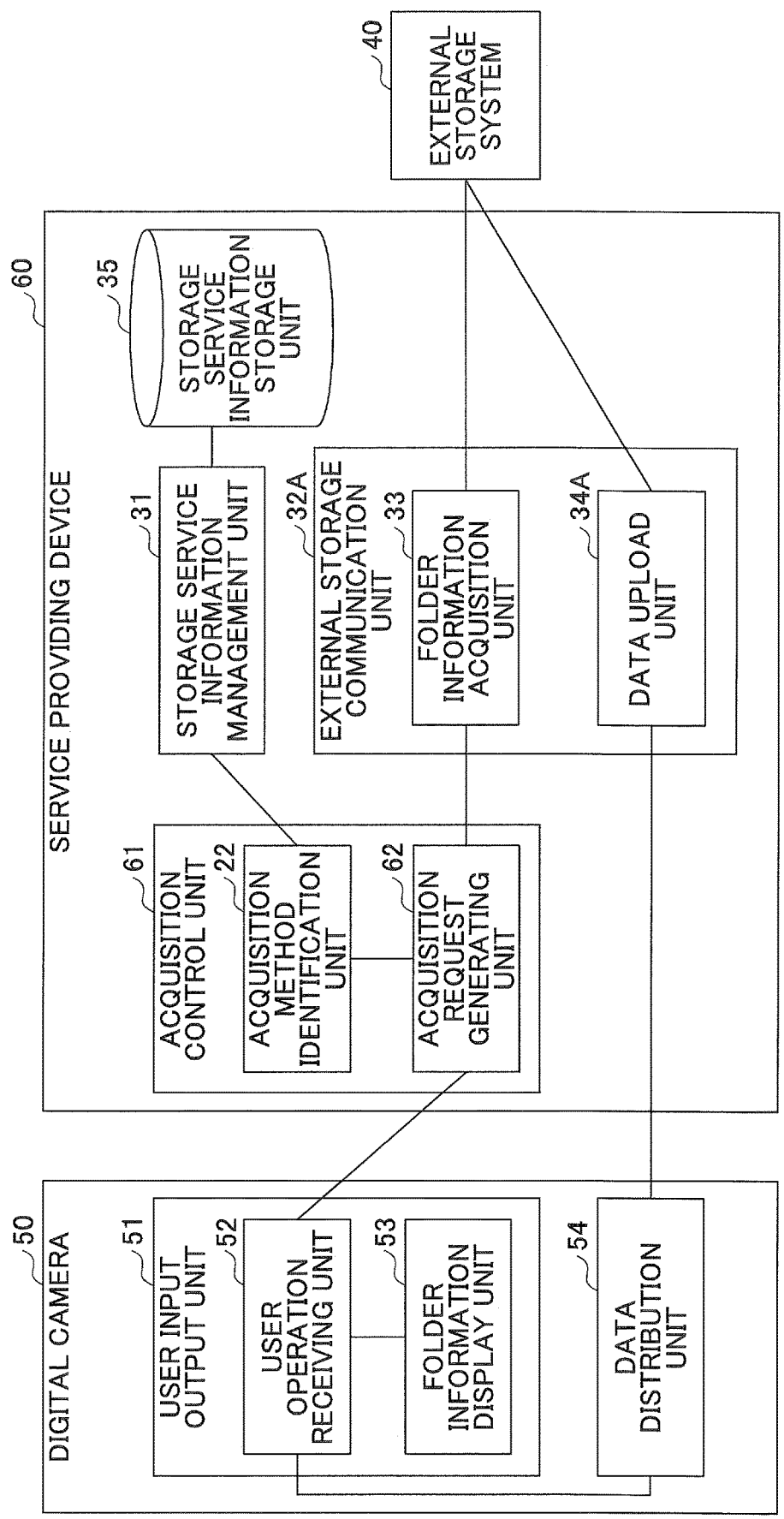
FIG. 21 is a process block diagram of an example of the information processing system according to the third embodiment.

Next, a description is given of a software configuration of the information processing system 1 according to the third embodiment. The information processing system 1 according to the third embodiment can be realized by, for example, the process blocks as illustrated in FIG. 21. FIG. 21 is a process block diagram of an example of the information processing system 1 according to the third embodiment.

The digital camera 50 includes a user input output unit 51 and a data distribution unit 54. Furthermore, the user input output unit 51 includes a user operation receiving unit 52 and a folder information display unit 53.

The user operation receiving unit 52 is realized by, for example, the CPU 306, the input device 301, etc., and receives various operations by the user. For example, the user operation receiving unit 52 receives various operations such as an operation of selecting image data to be stored in the storage service, an operation of selecting (specifying) the folder in the storage service to be the storage destination of the selected image data, etc.

The folder information display unit 53 is realized by, for example, the CPU 306, the display device 302, etc., and displays various screens. For example, the folder information display unit 53 displays a selection screen of a distribution image for selecting image data to be stored in the storage service, and a folder selection screen for selecting the folder to be the storage destination of the selected image data.

The data distribution unit 54 is realized by, for example, the CPU 306, etc., and requests the service providing device 60 to store the image data selected by the user in the specified storage destination folder in the storage service (upload request).

The service providing device 60 includes an acquisition control unit 61, a storage service information management unit 31, and an external storage communication unit 32A. Furthermore, the service providing device 60 uses a storage service information storage unit 35.

Furthermore, the acquisition control unit 61 includes an acquisition method identification unit 22 and an acquisition request generating unit 62, and the external storage communication unit 32A includes a folder information acquisition unit 33 and a data upload unit 34A.

Note that the acquisition method identification unit 22, the storage service information management unit 31, the folder information acquisition unit 33, and the storage service information storage unit 35 are the same as those of the first embodiment, and therefore descriptions thereof are omitted.

The acquisition request generating unit 62 is realized by, for example, the CPU 306, etc., and makes an acquisition request for folder information to the folder information acquisition unit 33, in response to a request from the digital camera 50.

The data upload unit 34A is realized by, for example, the CPU 306, the communication I/F 307, etc., and makes a request to upload image data to the external storage system 40, in response to a request from the data distribution unit 54 of the digital camera 50.

<Details of Process>

Next, a description is given of details of the process of the information processing system 1 according to the third embodiment. With respect to the information processing system 1 according to the first embodiment, a description is given of a process performed in a case where the user stores image data, which is stored in the digital camera 50, in a selected (specified) folder in the storage service (that is, a data distribution process). At this time, the folder selection screen in the digital camera 50 used by the user to select the folder to be the storage destination, is generated based on folder information acquired from the external storage system 40. In the following, the description of the acquisition method for acquiring folder information from the external storage system 40, is given separately for the case where the acquisition method is "Bundle" and for the case where the acquisition method is "OnlySubFolder".

Figure 22:
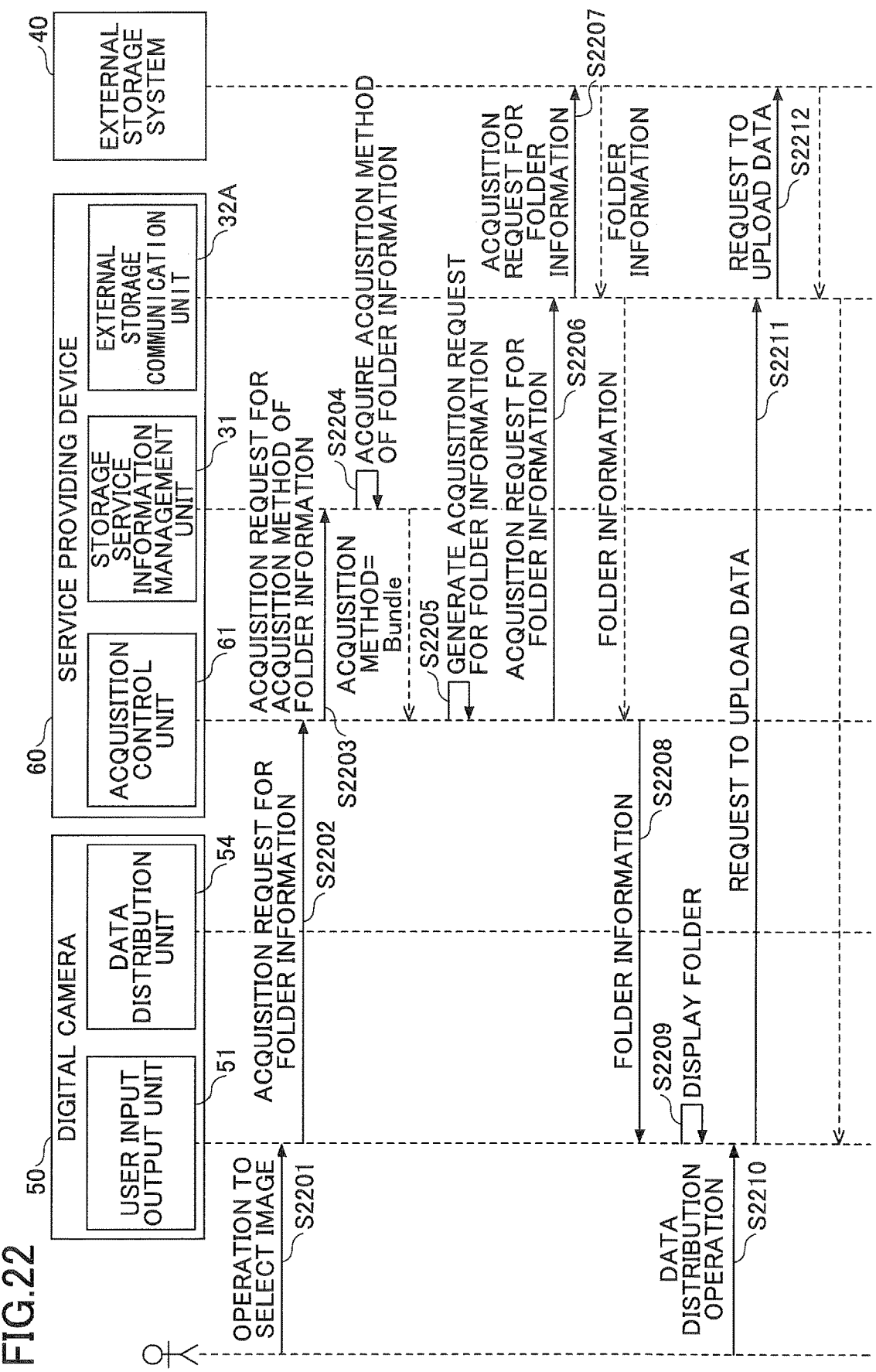
FIG. 22 is a sequence diagram of an example of a data distribution process according to the third embodiment.

First, a description is given of a case where the user stores image data in a desired folder in the external storage system 40$_1$ (the storage service "storage1" in which the acquisition method of the folder information is "Bundle"). FIG. 22 is a sequence diagram of an example of a data distribution process according to the third embodiment. Note that in the following, for the portions where the same processes as the scan distribution process described with reference to FIG. 6 are performed, the descriptions are simplified appropriately.

Here, the hierarchal structure of folders of the user in the external storage system 40$_1$ is assumed to be as illustrated in FIG. 7, similar to the first embodiment. Also, it is assumed that the user is desiring to store the image data in the folder having the folder name "folder3".

In step S2201, at the digital camera 50, the user performs an operation for selecting image data to be stored in the storage service. When the user performs this operation, the user operation receiving unit 52 of the digital camera 50 receives the operation.

Figure 23C:
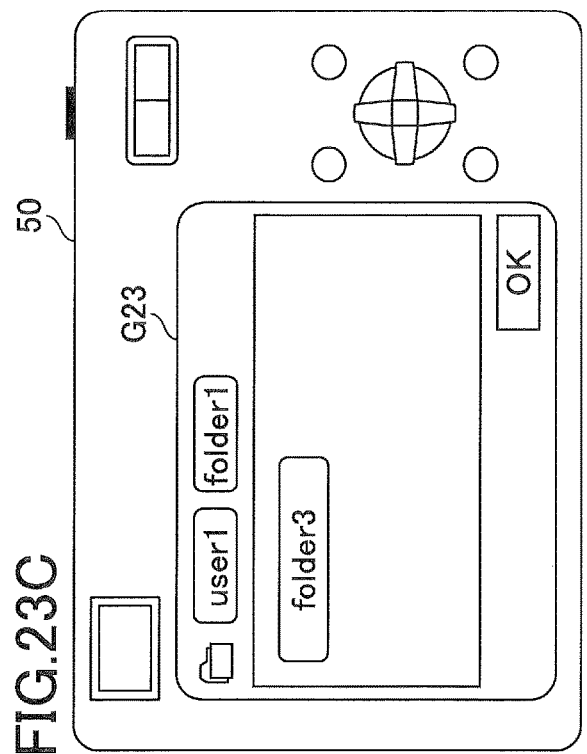
FIGS. 23A through 23D illustrate examples of a distribution image selection screen and folder selection screens.
Figure 23D:
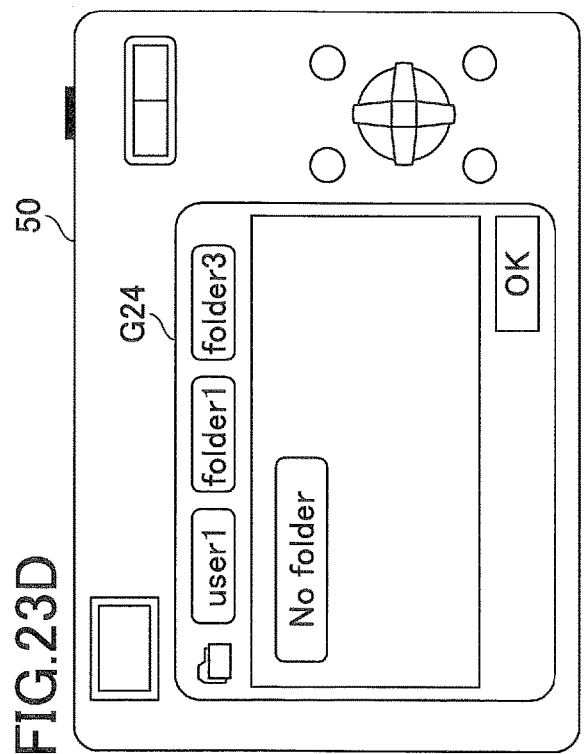
Figure 23A:
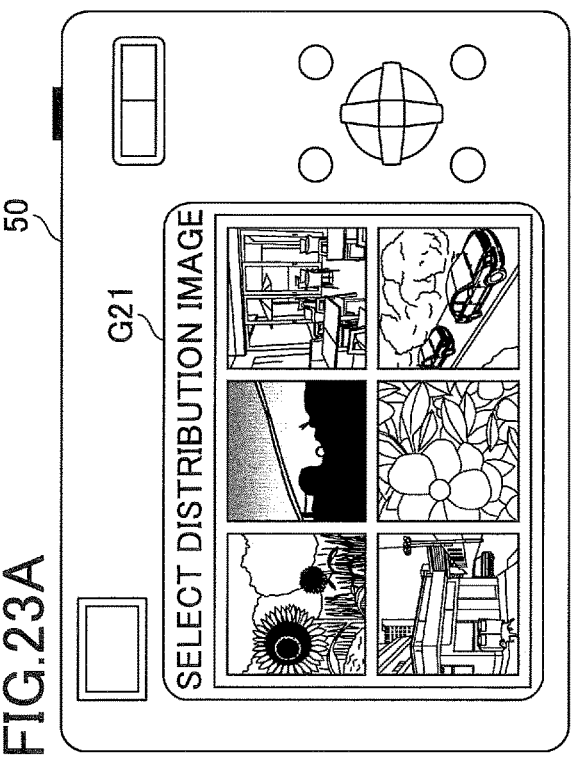

Here, for example, the user can select the image data that the user wants to store in the storage service, in a distribution image selection screen G21 as illustrated in FIG. 23A. In the distribution image selection screen G21 illustrated in FIG. 23A, the image data items stored in the digital camera 50 are displayed. The user can select one or more image data items that the user wants to store in the storage service, in the distribution image selection screen G21 illustrated in FIG. 23A.

In step S2202, when the above operation by the user is received, the user operation receiving unit 52 of the user input output unit 51 sends an acquisition request for folder information for displaying a folder selection screen on the display device 302, to the acquisition control unit 61 of the service providing device 60.

Note that in the present embodiment, the external storage system 40$_1$ having the storage service name "storage1" is set in advance as the storage destination of the image data selected in step S2201. Therefore, the acquisition request for the folder information includes the storage service name "storage1" and information relevant to the user (for example, a user name "user1").

However, for example, the storage service that is the storage destination of the image data may be selected by the user in the distribution image selection screen G21 illustrated in FIG. 23A, together with the selection of the image data to be the distribution target.

In step S2203, when the acquisition request for the folder information is received, the acquisition request generating unit 62 of the acquisition control unit 61 requests the acquisition method identification unit 22 to identify the acquisition method of the folder information. Then, the acquisition method identification unit 22 sends an acquisition request for the acquisition method of the folder information, to the storage service information management unit 31. Note that the acquisition request includes information relevant to the storage service (for example, the storage service name).

In step S2204, when the acquisition request for the acquisition method of the folder information is received, the storage service information management unit 31 refers to the storage service information 35D, and returns the storage service information of the corresponding storage service to the acquisition method identification unit 22. Note that the returned information is, for example, as illustrated in FIG. 8A, similar to the first embodiment.

In step S2205, the acquisition request generating unit 62 of the acquisition control unit 61 generates an acquisition request for the folder information, based on the acquisition method of the folder information identified in step S2204. Note that the acquisition method of the folder information generated here is, for example, as illustrated in FIG. 9A, similar to the first embodiment.

In step S2206, the acquisition request generating unit 62 of the acquisition control unit 61 sends the acquisition request for the folder information generated in step S2205, to the external storage communication unit 32A.

In step S2207, the folder information acquisition unit 33 of the external storage communication unit 32A sends the received acquisition request for the folder information, to the external storage system 40$_1$ set in advance. That is, the external storage communication unit 32A sends the acquisition request for the folder information to the host, which is included in the storage service information of FIG. 8A, acquired in step S2204. Then, the external storage system 40$_1$ returns the corresponding folder information to the service providing device 60. Note that the corresponding folder information returned here is, for example, as illustrated in FIG. 10, similar to the first embodiment.

In step S2208, the acquisition request generating unit 62 of the acquisition control unit 61 returns the received folder information to the user input output unit 51 of the digital camera 50.

Figure 23B:
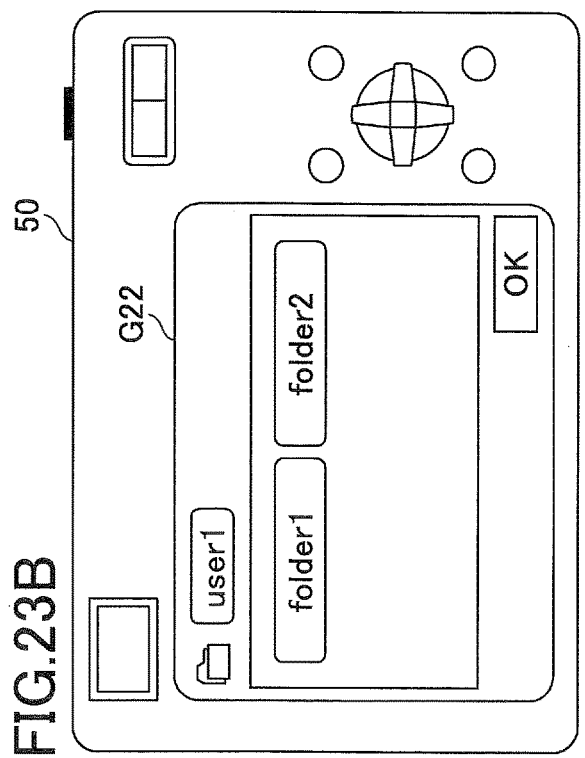

In step S2209, when the user operation receiving unit 52 receives the folder information, the folder information display unit 53 of the user input output unit 51 generates, for example, folder selection screens G22 through G24 as illustrated in FIGS. 23B through 23D, based on the received folder information. Then, the folder information display unit 53 displays the folder selection screen G22 of FIG. 23B indicating a screen for selecting folders in the folder name "user1".

In the folder selection screen G22 of FIG. 23B, when the user selects the folder name "folder1", as illustrated in FIG. 23C, the folder selection screen G23 is displayed. Furthermore, in the folder selection screen G23 of FIG. 23C, when the user selects the folder name "folder3", as illustrated in FIG. 23D, the folder selection screen G24 as illustrated in FIG. 23D is displayed.

Then, as described below, in FIG. 23D, as the user selects the "OK" button, the image data selected in FIG. 23A is stored in the "folder3" in external storage system $40_1$.

In step S2210, the user performs an operation for performing data distribution for uploading the image data in the selected storage destination folder, by selecting the "OK" button in the folder selection screen G22 in FIG. 23D. Then, when the user performs this operation, the user operation receiving unit 52 of the digital camera 50 receives this operation.

In step S2211, when the operation by the user is received, the user operation receiving unit 52 requests the external storage communication unit 32A to upload (distribute) the selected image data. Note that this request includes the storage service name of the external storage system $40_1$ that is the storage destination of the selected image data, information relevant to the storage destination folder selected in step S2209, and the image data selected in step S2201.

In step S2212, the data upload unit 34A of the external storage communication unit 32A sends the upload request received from the digital camera 50, to the corresponding external storage system $40_1$. Accordingly, the selected image data is stored in the selected folder in the external storage system $40_1$.

As described above, the information processing system 1 according to the present embodiment can store the data stored in the digital camera 50, in the external storage system 40 that can collectively acquire folder information of folders in the hierarchy of the specified folder and all hierarchies lower than that of the specified folder.

Next, a description is given of a case where the user desires to store image data in the external storage system $40_2$ (a storage service for which the method of acquiring the folder information is "OnlySubFolder"). FIG. 24 is a sequence diagram of another example of a data distribution process according to the third embodiment.

Here, the hierarchal structure of folders of the user in the external storage system $40_2$ is assumed to be as illustrated in FIG. 7, similar to the external storage system $40_1$. Also, it is assumed that the user is desiring to store the image data in the folder having the folder name "folder3". Note that in the following, for the portions where the same processes as the scan distribution process described with reference to FIG. 12 are performed, the descriptions are simplified appropriately.

First, the processes of steps S2041 through S2043 are the same as steps S2201 through S2203 of FIG. 22, and therefore descriptions thereof are omitted.

However, in the present embodiment, it is assumed that the external storage system $40_2$ having the storage service name "storage2" is set in advance as the storage destination of the image data selected in step S2401. Therefore, the acquisition request for the folder information sent in step S2402 includes the storage service name "storage2" and information relevant to the user (for example, a user name "user1").

In step S2404, when the acquisition request for the acquisition method of the folder information is received, the storage service information management unit 31 refers to the storage service information 35D, and returns the storage service information of the storage service to the acquisition method identification unit 22. Note that the returned information is, for example, as illustrated in FIG. 8B, similar to the first embodiment.

In step S2405, the acquisition request generating unit 62 of the acquisition control unit 61 generates an acquisition request for the folder information, based on the acquisition method of the folder information identified in step S2404. Note that the acquisition method of the folder information generated here is, for example, as illustrated in FIG. 9B, similar to the first embodiment.

In step S2406, the acquisition request generating unit 62 of the acquisition control unit 61 sends the acquisition request for the folder information generated in step S2405, to the external storage communication unit 32A.

In step S2407, the folder information acquisition unit 33 of the external storage communication unit 32A sends the received acquisition request for the folder information, to the external storage system $40_2$ set in advance. That is, the external storage communication unit 32A sends the acquisition request for the folder information to the host, which is included in the storage service information of FIG. 8B, acquired in step S2404. Then, the external storage system $40_2$ returns the corresponding folder information to the service providing device 60. Note that the folder information returned here is, for example, as illustrated in FIG. 14A, similar to the first embodiment.

Furthermore, when the corresponding folder information is returned, the acquisition request generating unit 62 determines whether subfolder information is specified in the specified folder ID. When subfolder information is specified, the process of step S2408 is performed.

In step S2408, the acquisition request generating unit 62 rewrites the subfolder presence flag in the subfolder information specified in "subfolder" in the folder information, to "true".

In step S2409, the acquisition request generating unit 62 of the acquisition control unit 61 returns the received folder information to the user input output unit 51 of the digital camera 50. Here, the folder information returned to the user input output unit 51 of the digital camera 50 is folder information after the subfolder presence flag has been rewritten, when the process of step S2408 has been performed.

In step S2410, when the user operation receiving unit 52 receives the folder information, the folder information display unit 53 of the user input output unit 51 generates, for example, folder selection screen G22 as illustrated in FIG. 23B, based on the received folder information. Then, the folder information display unit 53 displays the folder selection screen G22 of FIG. 23B indicating a screen for selecting folders in the folder name "user1".

Note that, at this time, the folder information display unit 53 may refer to the subfolder presence flag in the received folder information, and determine whether there is a folder in a further lower hierarchy. Then, according to the determination result, for example, the digital camera 50 may send a request to acquire folder information of a folder in a further lower hierarchy, to the service providing device 60.

Next, when the user selects, for example, a folder name "folder1" in the folder selection screen G22 illustrated in FIG. 23B, the processes of steps S2402 through S2410 as described above are executed, and a folder selection screen G23 as illustrated in FIG. 23C is displayed. That is, in this case, in step S2405, an acquisition request is generated to acquire the folder information in which the folder ID "yyy1" of the "folder1" is specified as "folder_id". Then, in step S2407, for example, as illustrated in FIG. 14B, the folder information of the folder having the folder name "folder1" and the folder having the folder name "folder3" immediately below the folder "folder1", is acquired. Then, in step S2410, a folder selection screen G23 as illustrated in FIG. 23C is displayed.

Similarly, for example, when the user selects a folder name "folder3" in the folder selection screen G23 illustrated in FIG. 23C, the processes of steps S2402 through S2410 as described above are executed, and a folder selection screen G24 as illustrated in FIG. 23D is displayed.

Then, in the process described below, as the user selects the "OK" button in FIG. 23D, the image data selected in FIG. 23A is stored in the folder "folder3" in the external storage system $40_2$.

The processes of steps S2411 through S2413 are the same as the processes of steps S2210 through S2212 in FIG. 22, and therefore descriptions thereof are omitted.

As described above, the information processing system 1 according to the present embodiment can store the data stored in the digital camera 50, into the external storage system 40 that can acquire folder information of folders in the hierarchy of the specified folder and one hierarchy lower than that of the specified folder.

An information processing system includes a service providing device for providing an external service and an external service cooperation device for requesting the external service to perform a predetermined process in cooperation with the service providing device. The information processing system includes a first storage unit for the external service cooperation device to store, in association with each other, identification information identifying an external service and information relating to an acquisition method for acquiring information of a folder from the external service, for each of a plurality of the external services respectively including the folder for storing electronic data; a receiving unit for the service providing device to receive, from a device connected to the information processing system via a network, a request to acquire, from a first external service among the plurality of the external services, the information of the folder included in the first external service; an identification unit for the service providing device to identify the acquisition method for acquiring the information of the folder from the first external service, based on the information relating to the acquisition method for acquiring the information of the folder stored in the first storage unit in association with the identification information identifying the first external service relating to the request, when the request is received by the receiving unit; a first acquisition unit for the external service cooperation device to acquire the information of the folder from the first external service, based on the acquisition method identified by the identification unit; and a sending unit for the service providing device to send the information of the folder acquired by the first acquisition unit, to the device that is a request source of the request. When the acquisition method identified by the identification unit is a first acquisition method of acquiring, from the external service, information of folders in a hierarchy of a specified folder and in a predetermined number of hierarchies lower than the hierarchy of the specified folder, the first acquisition unit acquires, from the first external service, the information of folders in a hierarchy of a specified folder and in a predetermined number of hierarchies lower than the hierarchy of the specified folder, and when the acquisition method identified by the identification unit is a second acquisition method of acquiring, from the external service, information of folders in a hierarchy of a specified folder and in all hierarchies lower than the hierarchy of the specified folder, the first acquisition unit acquires, from the first external service, the information of folders in a hierarchy of a specified folder and in all hierarchies lower than the hierarchy of the specified folder.

Note that the scan distribution unit 23 is an example of a receiving unit. The acquisition method identification unit 22 is an example of an identification unit. The scan distribution unit 23 and the folder information acquisition unit 33 are an example of a first acquisition unit. The storage service information storage unit 35 is an example of a first storage unit. The cache information storage unit 25 is an example of a second storage unit and a third storage unit.

According to one embodiment of the present invention, an information processing system, an information processing apparatus, and an information processing method are provided, which are capable of enabling the comfortable usage by a user who is using an external service.

The information processing system, the information processing apparatus, and the information processing method are not limited to the specific embodiments described herein, and variations and modifications may be made without departing from the spirit and scope of the present invention.

The present application is based on and claims the benefit of priority of Japanese Priority Patent Application No. 2014-216262, filed on Oct. 23, 2014 and Japanese Priority Patent Application No. 2015-181195, filed on Sep. 14, 2015, the entire contents of which are hereby incorporated herein by reference.

What is claimed is:

1. An information processing system including one or more information processing apparatuses for implementing various functions of the information processing system, the information processing system comprising:
 a processor; and
 a first memory storing program instructions that cause the processor to
  store storage service information for each external storage service of a plurality of external storage services in a first storage device, the stored storage service information identifying an external storage service and including folder hierarchy acquisition method information that specifies a folder hierarchy acquisition method used to acquire folder hierarchy information of one or more folders for storing electronic data of the external storage service;
  receive, from a requesting image forming apparatus connected to the information processing system via a network, a request to acquire the folder hierarchy information of a specified folder from among the one or more folders included in a selected external storage service from among the plurality of the external storage services;
  identify the folder hierarchy acquisition method used to acquire the folder hierarchy information of the specified folder included in the selected external storage service when the request is received by referring to the stored storage service information corresponding to the selected external storage service, the storage service information of the selected external storage service indicating whether the folder hierarchy acquisition method is a first folder hierarchy acquisition method or a second folder hierarchy acquisition method, wherein
   the first folder hierarchy acquisition method acquires folder hierarchy information of folders in a folder hierarchy of the specified folder and in a predetermined number of hierarchies below the hierarchy of the specified folder, from the selected external storage service, and the second folder hierarchy acquisition method acquires the folder hierarchy information of the folders in the folder hierarchy of the specified folder and in all of the hierarchies below the hierarchy of the specified folder, from the selected external storage service;

acquire the folder hierarchy information of the specified folder from the selected external storage service, based on the identified folder hierarchy acquisition method; and send the acquired folder hierarchy information of the specified folder to the requesting image forming apparatus, wherein when the identified folder hierarchy acquisition method is the first folder hierarchy acquisition method, the processor repeatedly acquires the folder hierarchy information of the folders in the hierarchy of the specified folder and in the predetermined number of hierarchies lower than the hierarchy of the specified folder, when the identified folder hierarchy acquisition method is the second folder hierarchy acquisition method, the processor acquires the folder hierarchy information of the folders in the hierarchy of the specified folder and in all hierarchies lower than the hierarchy of the specified folder, and the image forming apparatus displays a folder selection screen by which a user selects a storage destination folder on a display of the image forming apparatus based on the received folder hierarchy information of the specified folder.

2. The information processing system according to claim 1, further comprising:

a second storage device configured to store the folder hierarchy information of the specified folder, wherein when the identified folder hierarchy information acquisition method is the first acquisition method, the processor repeatedly acquires the folder hierarchy information of folders in the hierarchy of the specified folder and in the predetermined number of hierarchies lower than the hierarchy of the specified folder, the folder hierarchy information of folders is acquired in units of the predetermined number of hierarchies, and the acquired folder hierarchy information of the folders is stored in the second storage device.

3. The information processing system according to claim 2, wherein the folder hierarchy information of folders in the hierarchy of the specified folder and in the predetermined number of hierarchies lower than the hierarchy of the specified folder, is repeatedly acquired in units of the predetermined number of hierarchies according to a predetermined priority order, and the acquired information of the folders is stored in the second storage device.

4. The information processing system according to claim 2, wherein the program instructions further cause the processor to acquire the folder hierarchy information of the specified folder of the selected external storage service based on the identified folder hierarchy acquisition method, wherein when the identified folder hierarchy acquisition method is the first folder hierarchy acquisition method, the processor repeatedly acquires, in a manner as to supplement each other, the folder hierarchy information of folders in the hierarchy of the specified folder and in the predetermined number of hierarchies lower than the hierarchy of the specified folder, in units of the predetermined number of hierarchies, and the acquired folder hierarchy information of the specified folder of the selected external service and the folder hierarchy information of the specified folder of the selected external service acquired based on the identified folder hierarchy acquisition method are respectively stored in the second storage device.

5. The information processing system according to claim 2, further comprising:

a third storage device configured to store the folder hierarchy information of the specified folder, wherein contents of the folder hierarchy information of the specified folder stored in the third storage device are processed by at least one method of synchronizing and supplementing with contents of the folder hierarchy information of the specified folder stored in the second storage device, at a predetermined timing.

6. The information processing system according to claim 2, wherein the program instructions further cause the processor to send, to the image forming apparatus that is the request source of the request, either one of the folder hierarchy information of the specified folder acquired from the selected external storage service or the folder hierarchy information of the specified folder stored in the second storage device.

7. The information processing system according to claim 2, wherein the folder hierarchy information of the specified folder stored in the second storage device includes identification information uniquely identifying each of the folders, and path information indicating a storage destination in the external storage service that is a parent folder including the folder.

8. The information processing system according to claim 1, wherein the image forming apparatus includes one or more of an image capturing function, a scanning function, a print function, a copy function, or a fax communication function.

9. An information processing apparatus comprising:

a processor; and a memory storing program instructions that cause the processor to store storage service information for each external storage service of a plurality of external storage services in a first storage device, the stored storage service information identifying an external storage service and including folder hierarchy acquisition method information that specifies a folder hierarchy acquisition method used to acquire folder hierarchy information of one or more folders for storing electronic data of the external storage service;

receive, from a requesting image forming apparatus connected to the information processing apparatus via a network, a request to acquire the folder hierarchy information of a specified folder from among the one or more folders included in a selected external storage service from among the plurality of the external storage services;

identify the folder hierarchy acquisition method used to acquire the folder hierarchy information of the specified folder included in the selected external storage service when the request is received by referring to the stored storage service information corresponding to the selected external storage service, the storage service information of the selected external storage service indicating whether the folder hierarchy acquisition method is a first folder hierarchy acquisition method or a second folder hierarchy acquisition method, wherein
the first folder hierarchy acquisition method acquires folder information of folders in a folder hierarchy of the specified folder and in a predetermined number of hierarchies below the hierarchy of the specified folder, from the selected external storage service, and
the second folder hierarchy acquisition method acquires the folder information of the folders in the folder hierarchy of the specified folder and in all of the hierarchies below the hierarchy of the specified folder, from the selected external storage service;
acquire the folder hierarchy information of the specified folder from the selected external storage service, based on the identified folder hierarchy acquisition method; and
send the acquired folder hierarchy information of the specified folder to the requesting image forming apparatus, wherein
when the identified folder hierarchy acquisition method is the first folder hierarchy acquisition method, the processor repeatedly acquires the folder hierarchy information of the folders in the hierarchy of the specified folder and in the predetermined number of hierarchies lower than the hierarchy of the specified folder,
when the identified folder hierarchy acquisition method is the second folder hierarchy acquisition method, the processor acquires the folder hierarchy information of the folders in the hierarchy of the specified folder and in all hierarchies lower than the hierarchy of the specified folder, and
the image forming apparatus displays a folder selection screen by which a user selects a storage destination folder on a display of the image forming apparatus based on the received folder hierarchy information of the specified folder.

10. The information processing apparatus according to claim 9, wherein the image forming apparatus connected to the information processing apparatus includes one or more of an image capturing function, a scanning function, a print function, a copy function, or a fax communication function.

11. An information processing method performed by an information processing system including a memory configured to store storage service information for each external storage service of a plurality of external storage services in a first storage device, the stored storage service information identifying an external storage service and including folder hierarchy acquisition method information that specifies a folder hierarchy acquisition method used to acquire folder hierarchy information of one or more folders for storing electronic data of the external storage service, and one or more information processing apparatuses for implementing various functions of the information processing system, the information processing method comprising:

receiving, from a requesting image forming apparatus connected to the information processing system via a network, a request to acquire the folder hierarchy information of a specified folder from among the one or more folders included in a selected external storage service from among the plurality of the external storage services;
identifying the folder hierarchy acquisition method used to acquire the folder hierarchy information of the specified folder included in the selected external storage service when the request is received by referring to the stored storage service information corresponding to the selected external storage service, the storage service information of the selected external storage service indicating whether the folder hierarchy acquisition method is a first folder hierarchy acquisition method or a second folder hierarchy acquisition method, wherein
the first folder hierarchy acquisition method acquires folder information of folders in a folder hierarchy of the specified folder and in a predetermined number of hierarchies below the hierarchy of the specified folder, from the selected external storage service, and
the second folder hierarchy acquisition method acquires the folder information of the folders in a folder hierarchy of the specified folder and in all of the hierarchies below the hierarchy of the specified folder, from the selected external storage service;
acquiring the folder hierarchy information of the specified folder from the selected external storage service, based on the identified folder hierarchy acquisition method; and
sending the acquired folder hierarchy information of the specified folder to the requesting image forming apparatus, wherein
when the identified folder hierarchy acquisition method is the first folder hierarchy acquisition method, the folder hierarchy information of the folders in the hierarchy of the specified folder, and in the predetermined number of hierarchies lower than the hierarchy of the specified folder, is repeatedly acquired from the selected external storage service,
when the identified folder hierarchy acquisition method is the second folder hierarchy acquisition method, the folder hierarchy information of the folders in the hierarchy of the specified folder and in all hierarchies lower than the hierarchy of the specified folder, is acquired from the selected external storage service, and
the image forming apparatus displays a folder selection screen by which a user selects a storage destination folder on a display of the image forming apparatus based on the received folder hierarchy information of the specified folder.

12. The information processing method according to claim 11, wherein the image forming apparatus includes one or more of an image capturing function, a scanning function, a print function, a copy function, or a fax communication function.

* * * * *